United States Patent
Peng et al.

(10) Patent No.: US 12,522,393 B2
(45) Date of Patent: Jan. 13, 2026

(54) YARN SPINDLE PACKAGING SYSTEM AND CONTROL METHOD THEREOF, ELECTRONIC DEVICE AND STORAGE MEDIUM

(71) Applicants: ZHEJIANG HENGYI PETROCHEMICAL CO., LTD., Zhejiang (CN); TAICANG YIFENG CHEMICAL FIBER CO., LTD., Jiangsu (CN); Hangzhou Yitong New Material Co., Ltd., Hangzhou (CN)

(72) Inventors: Xiantao Peng, Zhejiang (CN); Peng Wang, Zhejiang (CN); Yibo Qiu, Zhejiang (CN); Yu Guo, Zhejiang (CN); Quan Zhou, Zhejiang (CN); Dake Li, Zhejiang (CN)

(73) Assignees: ZHEJIANG HENGYI PETROCHEMICAL CO., LTD., Hangzhou (CN); TAICANG YIFENG CHEMICAL FIBER CO., LTD., Suzhou (CN); Hangzhou Yitong New Material Co., Ltd., Hangzhou (CN)

( * ) Notice: Subject to any disclaimer, the term of this patent is extended or adjusted under 35 U.S.C. 154(b) by 0 days.

(21) Appl. No.: 18/736,320

(22) Filed: Jun. 6, 2024

(65) Prior Publication Data

US 2025/0121974 A1     Apr. 17, 2025

(30) Foreign Application Priority Data

Oct. 17, 2023   (CN) .......................... 202311344366.6

(51) Int. Cl.
B65B 57/14     (2006.01)
B65B 57/18     (2006.01)
(Continued)

(52) U.S. Cl.
CPC .............. B65B 57/14 (2013.01); B65B 57/18 (2013.01); B65B 65/003 (2013.01);
(Continued)

(58) Field of Classification Search
CPC ....... B65B 57/14; B65B 57/18; B65B 65/003; B65B 2210/02; B65H 67/063;
(Continued)

(56) References Cited

U.S. PATENT DOCUMENTS 5,337,967 A  *  8/1994  Teich et al. .......... B65H 67/064
                                                              242/473.6
2019/0276241 A1     9/2019  Royce et al.
(Continued)

FOREIGN PATENT DOCUMENTS

CN        104944092 A      9/2015
CN        110171745 A      8/2019
(Continued)

OTHER PUBLICATIONS

Decision to Grant a Patent for Japanese Application No. 2024-153021 dated Dec. 12, 2024, 2 pages.
(Continued)

*Primary Examiner* — Stephen F. Gerrity
(74) *Attorney, Agent, or Firm* — Meunier Carlin & Curfman LLC

(57) ABSTRACT

Provided is a yarn spindle packaging system, a control method thereof, an electronic device and a storage medium, relating to technical field of chemical fiber intellectualization. Specifically, the yarn spindle packaging system includes: a control apparatus, a dispatching apparatus, stand-alone devices, and AGV devices, the control apparatus generates demand information based on the working data returned from each stand-alone device, the dispatching apparatus generates a dispatching instruction based on the
(Continued)

demand information and state information of the AGV devices, each stand-alone device receives the packaging task and the device control parameter corresponding thereto sent from the control apparatus, and the target AGV device receives the dispatching instruction corresponding thereto, determines a first and a second stand-alone devices corresponding thereto based on the dispatching instruction corresponding thereto and transports a target yarn spindle to be transported from the first to the second stand-alone device.

20 Claims, 9 Drawing Sheets

(51) Int. Cl.
  *B65B 65/00* (2006.01)
  *B65H 67/06* (2006.01)
  *B66F 9/06* (2006.01)
  *G05B 19/418* (2006.01)
(52) U.S. Cl.
  CPC ......... *B65H 67/063* (2013.01); *B65H 67/064* (2013.01); *B65H 67/066* (2013.01); *B66F 9/063* (2013.01); *B65B 2210/02* (2013.01); *B65H 2701/31* (2013.01); *G05B 19/41865* (2013.01); *G05B 19/41895* (2013.01); *G05B 2219/45048* (2013.01)
(58) Field of Classification Search
  CPC ............................ B65H 67/064; B65H 67/066; B65H 2701/31; B66F 9/063; G05B 19/418; G05B 19/41865; G05B 19/41895; G05B 2219/45048; G06Q 10/08
  See application file for complete search history.

(56) References Cited

U.S. PATENT DOCUMENTS

| | | | |
|---|---|---|---|
| 2022/0254005 A1 | 8/2022 | Wilkinson et al. | |
| 2023/0127643 A1* | 4/2023 | Ghiotti et al. | B65B 65/003 53/396 |
| 2023/0297112 A1* | 9/2023 | Takao et al. | B66F 9/0755 701/25 |

FOREIGN PATENT DOCUMENTS

| | | | | |
|---|---|---|---|---|
| CN | 110424076 A | | 11/2019 | |
| CN | 111086693 A | * | 5/2020 | ............. B65B 57/14 |
| CN | 111275370 A | * | 6/2020 | ............ G06Q 10/087 |
| CN | 210681425 U | * | 6/2020 | |
| CN | 211769061 U | | 10/2020 | |
| CN | 113120693 A | | 7/2021 | |
| CN | 113743747 A | | 12/2021 | |
| CN | 111439514 B | * | 2/2022 | ........... B65G 1/0485 |
| CN | 114162674 A | * | 3/2022 | ............. B65H 67/06 |
| CN | 114267167 A | * | 4/2022 | |
| CN | 114538205 A | | 5/2022 | |
| CN | 115097844 A | | 9/2022 | |
| CN | 115180201 A | | 10/2022 | |
| CN | 115184882 A | | 10/2022 | |
| CN | 217554062 A | | 10/2022 | |
| CN | 217554062 U | | 10/2022 | |
| CN | 217577827 U | * | 10/2022 | |
| CN | 115384882 A | | 11/2022 | |
| CN | 116605464 A | | 8/2023 | |
| CN | 114715725 B | * | 9/2023 | ............. B65H 67/00 |
| CN | 116873433 A | | 10/2023 | |
| CN | 116882719 A | | 10/2023 | |
| DE | 102021101354 A1 | * | 7/2022 | ........ G05B 19/41895 |
| JP | S4814040 B | | 5/1973 | |
| JP | S6382286 A | | 4/1988 | |
| JP | H0517074 A | * | 1/1993 | ........... B65H 67/063 |
| JP | H05208784 A | | 8/1993 | |
| JP | H11165814 A | | 6/1999 | |
| JP | 2003205917 A | | 7/2003 | |
| JP | 2003237743 A | | 8/2003 | |
| JP | 2012176771 A | | 9/2012 | |
| JP | 2022100437 A | | 7/2022 | |
| WO | 2021254415 A1 | | 12/2021 | |

OTHER PUBLICATIONS

First Office Action for Japanese Application No. 2024-153021 dated Oct. 8, 2024, 3 pages.

First Office action for Chinese Application No. 202311344366.6 dated Jul. 31, 2025.

Partial European Search Report for European Application No. 24180725.4 dated May 27, 2025.

* cited by examiner

YARN SPINDLE PACKAGING SYSTEM AND CONTROL METHOD THEREOF, ELECTRONIC DEVICE AND STORAGE MEDIUM

CROSS-REFERENCE TO RELATED APPLICATIONS

The present application claims priority to Chinese Patent Application No. CN202311344366.6, filed with the China National Intellectual Property Administration on Oct. 17, 2023, the disclosure of which is hereby incorporated herein by reference in its entirety.

TECHNICAL FIELD

The present disclosure relates to a field of chemical fiber intellectualization, and in particular, to a yarn spindle packaging system, and a control method and apparatus thereof.

BACKGROUND

In the process of yarn spindle packaging, the yarn spindle packaging includes a plurality of packaging processes, each of which is implemented by different stand-alone devices. At present, the transport of the yarn spindle from the current stand-alone device to the next stand-alone device is usually realized by a conveyor belt. However, the way of transporting the yarn spindle by the conveyor belt is not flexible enough, so that the full-flow intellectualization of the yarn spindle packaging cannot be realized. Therefore, how to realize intelligent yarn spindle transportation becomes a technical problem to be solved urgently.

SUMMARY

The disclosure provides a yarn spindle packaging system, and a control method and apparatus thereof.

According to a first aspect of the disclosure, provided is yarn spindle packaging system, including a control apparatus, a dispatching apparatus, a plurality of stand-alone devices, and a plurality of Automated Guided Vehicle (AGV) devices,
  wherein the control apparatus is configured to generate a packaging task and a device control parameter of each stand-alone device according to a number and a type of a yarn spindle to be packaged;
  each stand-alone device is configured to receive the packaging task and the device control parameter corresponding to the stand-alone device sent from the control apparatus, to execute the packaging task corresponding to the stand-alone device based on the device control parameter corresponding to the stand-alone device, and further to send working data corresponding to the packaging task corresponding to the stand-alone device to the control apparatus;
  the control apparatus is further configured to generate demand information based on the working data returned from each stand-alone device;
  the dispatching apparatus is further configured to generate a dispatching instruction based on the demand information and respective state information corresponding to a plurality of AGV devices, wherein the dispatching instruction is configured to dispatch movement of a target AGV device; and
  the target AGV device is configured to receive the dispatching instruction corresponding to the target AGV device, determine a first stand-alone device and a second stand-alone device corresponding to the target AGV device based on the dispatching instruction corresponding to the target AGV device, and transport a target yarn spindle to be transported from the first stand-alone device to the second stand-alone device.

According to a second aspect of the disclosure, provided is a control method of a yarn spindle packaging system, including:
  generating a packaging task and a device control parameter of each stand-alone device according to a number and a type of a yarn spindle to be packaged, so that each stand-alone device executes the packaging task corresponding to the stand-alone device based on the device control parameter corresponding to the stand-alone device;
  generating demand information based on the working data returned from each stand-alone device;
  generating a dispatching instruction based on the demand information and respective state information corresponding to a plurality of AGV devices; and
  controlling a target AGV device to determine a first stand-alone device and a second stand-alone device corresponding to the target AGV device based on the dispatching instruction corresponding to the target AGV device and transporting a target yarn spindle to be transported from the first stand-alone device to the second stand-alone device,
  wherein the yarn spindle packaging system adopts the yarn spindle packaging system as described in the first aspect.

According to a third aspect of the disclosure, provided is a control apparatus of a yarn spindle packaging system, including:
  a first generating module, configured to generate a packaging task and a device control parameter of each stand-alone device according to a number and a type of a yarn spindle to be packaged, so that each stand-alone device executes the packaging task corresponding to the stand-alone device based on the device control parameter corresponding to the stand-alone device;
  a second generating module, configured to generate demand information based on the working data returned from each stand-alone device;
  a dispatching module, configured to generate a dispatching instruction based on the demand information and respective state information corresponding to a plurality of AGV devices;
  a control module, configured to control a target AGV device to determine a first stand-alone device and a second stand-alone device corresponding to the target AGV device based on the dispatching instruction corresponding to the target AGV device and transport a target yarn spindle to be transported from the first stand-alone device to the second stand-alone device,
  wherein the yarn spindle packaging system adopts the yarn spindle packaging system as described in the first aspect.

According to a fourth aspect, provided is an electronic device, including:
  at least one processor; and a memory connected in communication with the at least one processor,
  wherein the memory stores an instruction executable by the at least one processor, and the instruction, when executed by the at least one processor, enables the at least one processor to execute any method of the embodiment of the present disclosure.

According to a fifth aspect, provided is a non-transitory computer-readable storage medium storing a computer instruction thereon, wherein the computer instruction is used to cause a computer to execute any method of the embodiment of the present disclosure.

According to the technologies of the disclosure, the dispatching apparatus can generate the dispatching instruction through the state information of the AGV devices and the demand information generated by the control apparatus to dispatch the AGV devices, thereby realizing intelligent yarn spindle transportation of the AGV device among the stand-alone devices, improving the intelligentization and the flexibility of the yarn spindle packaging system, improving efficiency of the yarn spindle transportation, and improving efficiency of the yarn spindle packaging.

It should be understood that the content described in this part is not intended to identify critical or essential features of the embodiment of the present disclosure, nor is it used to limit the scope of the present disclosure. Other features of the present disclosure will be easily understood through the following description.

BRIEF DESCRIPTION OF THE DRAWINGS

The above and other features, advantages and aspects of the embodiment of the present disclosure will become more apparent in conjunction with the accompanying figures and with reference to the following detailed description. In the drawings, like or similar reference numerals denote like or similar elements, in which.

DETAILED DESCRIPTION

Exemplary embodiments of the present disclosure will be described below with reference to the accompanying drawings, in which various details of the embodiment of the present disclosure are included to assist understanding, and which are considered to be merely exemplary. Accordingly, an ordinary person skilled in the art will understand that various changes and modifications of the embodiment described herein can be made without departing from the scope and spirit of the disclosure. Also, descriptions of well-known functions and constructions will be omitted in the following description for clarity and conciseness.

The terms "first", "second", and "third" etc. in the embodiments and claims of the description and the above-described drawings in the present disclosure are used for distinguishing between similar elements and not necessarily for describing a particular sequential or chronological order. Furthermore, the terms "include" and "have" as well as any variations thereof, are intended to cover a non-exclusive inclusion, such that including a list of steps or units. The methods, systems, products or devices are not necessary to be limited to the explicitly listed steps or elements, but may include other steps or units not expressly listed or inherent to such processes, methods, products or devices.

In the related art, a conventional yarn spindle packaging line transports yarn spindles from a current process to a next process by a conveyor belt. However, the transportation of the yarn spindles by means of the conveyor belt is not flexible, and may reduce the efficiency of packaging the yarn spindles. In addition, the transportation of the yarn spindles by means of the conveyor belt cannot be applied to the packaging of various types of the yarn spindles.

In order to at least partially solve one or more of the above problems and other potential problems, the present disclosure proposes a yarn spindle packaging system, a control method and apparatus thereof. Dispatching instructions are generated based on demand information generated by the control apparatus and state information of the AGV device, the AGV device determines a first stand-alone device and a second stand-alone device corresponding to the AGV device based on the dispatching instruction corresponding thereto, and transports a target yarn spindle to be transported from the first stand-alone device to the second stand-alone device, thereby realizing the intelligent yarn spindle transportation of the AGV device among the stand-alone devices and improving the intelligentization and flexibility of the yarn spindle packaging system, the yarn spindle transportation efficiency, and the yarn spindle packaging efficiency.

Figure 1:
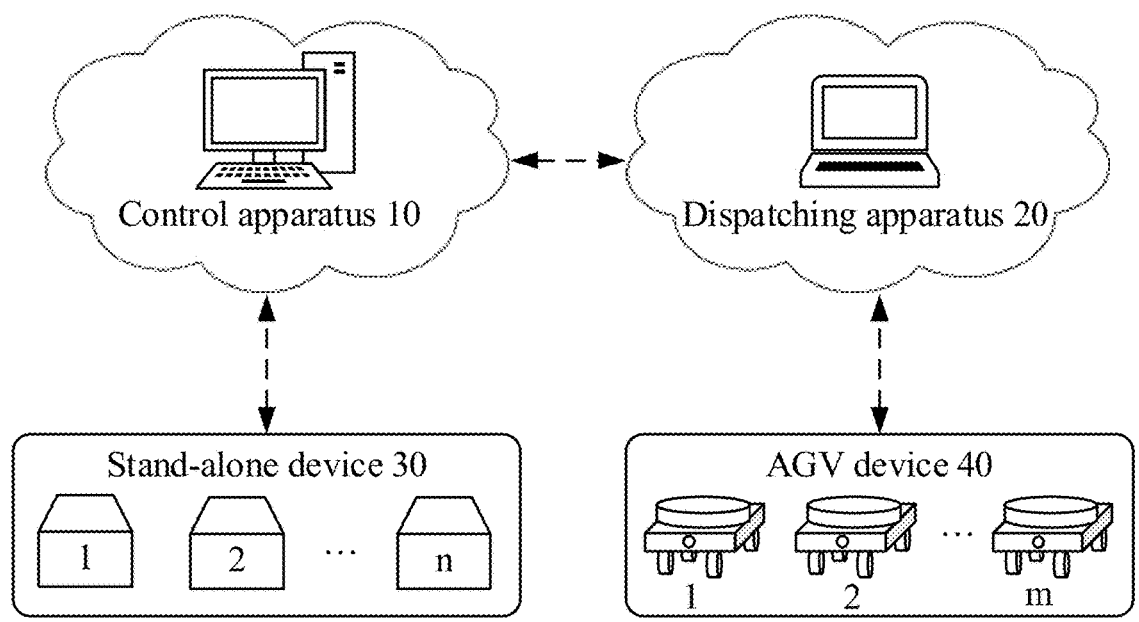
FIG. 1 is a schematic view showing a composition of a yarn spindle packaging system in accordance with the embodiment of the present disclosure.

The embodiment of the present disclosure provides a yarn spindle packaging system, as shown in FIG. 1, including a control apparatus 10, a dispatching apparatus 20, a plurality of stand-alone devices 30, and a plurality of AGV devices 40, wherein, the control apparatus 10 is configured to generate a packaging task and a device control parameter of each stand-alone device 30 according to a number and a type of a yarn spindle to be packaged;

each stand-alone device 30 is configured to receive the packaging task and the device control parameter corresponding to the stand-alone device sent from the control apparatus 10, to execute the packaging task corresponding to the stand-alone device based on the device control parameter corresponding to the stand-alone device, further to send working data corresponding to the packaging task corresponding to the stand-alone device to the control apparatus 10;

the control apparatus 10 is further configured to generate demand information based on the working data returned from each stand-alone device 30;

the dispatching apparatus 20 is further configured to generate a dispatching instruction based on the demand information and respective state information corresponding to a plurality of AGV devices 40, wherein the dispatching instruction is configured to dispatch movement of a target AGV device 40; and the target AGV device 40 is configured to receive the dispatching instruction corresponding to the target AGV device, determine a first stand-alone device and a second stand-alone device corresponding to the target AGV device based on the dispatching instruction corresponding to the target AGV device, and transport a target yarn spindle to be transported from the first stand-alone device to the second stand-alone device.

In the embodiment of the disclosure, the control apparatus may control a plurality of stand-alone devices. The dispatching apparatus may dispatch a plurality of AGV devices. The control apparatus may be in communication with the dispatching apparatus.

In the embodiment of the disclosure, the control apparatus may be an apparatus with automated control logic. The control apparatus may be disposed on an electronic device for controlling a flow line of the yarn spindle packaging, and the electronic device may be a server or a computer located in a field center control room for controlling operations of each stand-alone device and each AGV device disposed on the packaging site. Here, the present disclosure does not limit the type of electronic device in which the control apparatus is located.

In the embodiment of the disclosure, the dispatching apparatus may be an apparatus with automation control logic. The dispatching apparatus may be disposed on an electronic device for controlling a production line of the yarn spindle packaging, and the electronic device may be a server or a computer located in a field central control room or may be a server or a computer located in a packaging site for controlling operations of the AGV devices disposed in the packaging site. Here, the present disclosure does not limit the type of electronic device in which the control apparatus is located.

Figure 2:
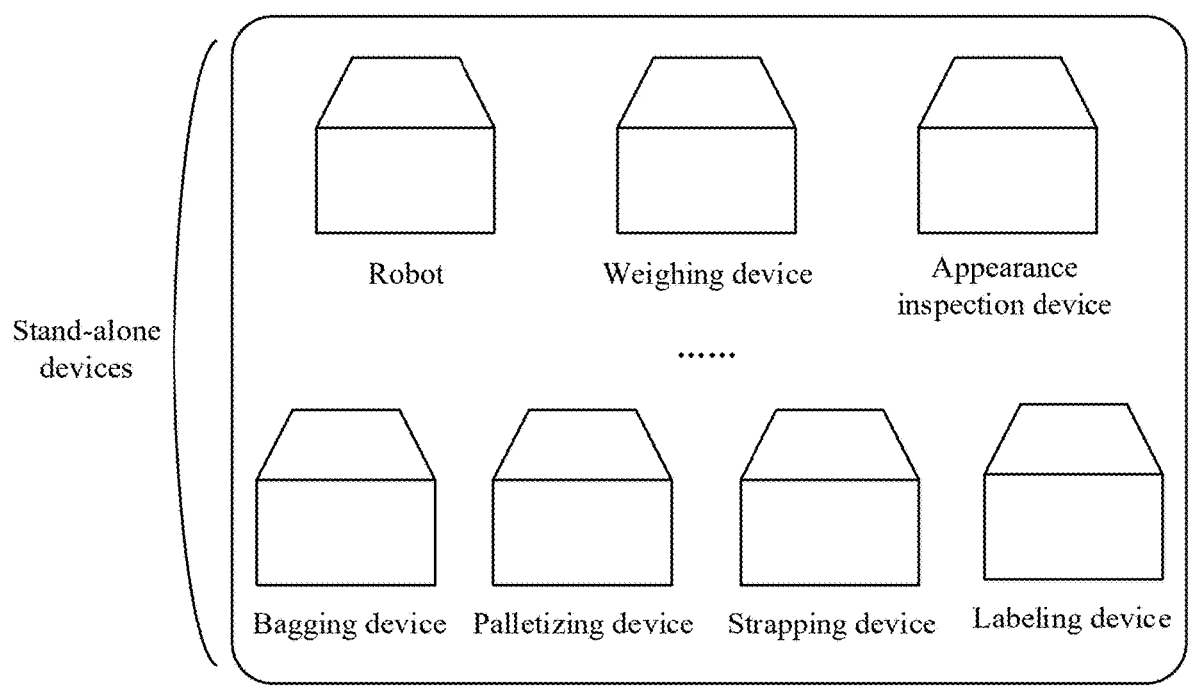
FIG. 2 is a schematic view showing types of the stand-alone devices in accordance with the embodiment of the present disclosure.

As shown in FIG. 2, the plurality of stand-alone devices may include: a robot, a weighing device, an appearance inspection device, a bagging device, a palletizing device, a strapping device and a labeling device, for example.

In the embodiment of the disclosure, the robot is used to remove the yarn spindle from a trolley and insert the yarn spindle onto a tray. The robot may be a robot hand or a device having a robot hand.

In the embodiment of the disclosure, the weighing device is used to weigh the yarn spindle.

In the embodiment of the disclosure, the appearance inspection device is used for appearance inspection of the yarn spindle. The appearance inspection device may be an inspection device formed by a camera, which can determine whether the yarn spindle has an appearance defect or a broken paper tube based on a yarn spindle image captured by the camera and give an appearance inspection result and a final yarn spindle grade.

In the embodiment of the disclosure, the bagging device is used to sleeve a packaging bag over a surface of the yarn spindle.

In the embodiment of the disclosure, the palletizing device is used to remove the bagged yarn spindle from a tray and palletize the yarn spindles into a stack.

In the embodiment of the disclosure, the strapping device is used to strap the palletized yarn spindles.

In the embodiment of this disclosure, the labeling device is used to attach a label on a side of the whole stack of yarn spindles. The label includes information of a set of yarn spindles such as production information, production process and quality control grade.

In the embodiment of the disclosure, a production line of the yarn spindle packaging includes a plurality of stand-alone devices, the plurality of stand-alone devices in the production line of the yarn spindle packaging are different devices, and at least one stand-alone device for each type is disposed in the production line. Specifically, the plurality of stand-alone devices can include a robot, a weighing device, an appearance inspection device, a bagging device, a palletizing device, a strapping device and a labeling device.

In the embodiment of the disclosure, the dispatching apparatus may dispatch a plurality of movable devices; specifically, the dispatching apparatus may dispatch AGV devices based on the working data returned from each stand-alone device. The movable device may include an AGV device, a patrol inspection device, a trolly and other movable devices.

In the embodiment of the disclosure, the production line of the yarn spindle packaging may be understood as a part of a yarn spindle packaging system. The production line of the yarn spindle packaging may include a plurality of stand-alone devices, the stand-alone devices are used to perform different packaging operations on the wound yarn spindle, and the plurality of stand-alone devices may be connected through a transportation device. The stand-alone device is understood as a device at any working station on the production line of the yarn spindle packaging. The AGV device can be understood as a device for conveying a tray moving on the production line of the yarn spindle packaging. A speed of the AGV device may be selected and adjusted according to and through the dispatching apparatus.

In some implementations, packaging tasks are different for stand-alone devices. For example, the weighing device is used for weighing the yarn spindle; the appearance inspection device is used for appearance inspection on the yarn spindle; and the bagging device is used for sleeving the packaging bag on the surface of the yarn spindle. The packaging task of the stand-alone device can include the number of target yarn spindles to be packaged, the time when the first batch or the first yarn spindle starts being packaged and the time when the last batch or the last yarn spindle finishes being packaged. Here, the packaging task may further include a work start time and a work end time, which may refer to the time when each stand-alone device starts work and the time when each stand-alone device ends work.

In some implementations, the device control parameter may include a device control parameter customized for a packaging task for a stand-alone device. For example, the device control parameters may include interval time, distance, and the like.

In some implementations, the working data is data that may be used to represent a working status of a stand-alone device. Specifically, the working data may include: data for indicating "In-service", or "Ready-for-service", or "Suspend-for-service", or "Service-failed", and data such as the number of yarn spindles that have been packaged and the number of yarn spindles that have not been packaged. The stand-alone devices need to send the working data corresponding to the packaging task to the control apparatus within a first preset time. Here, the control apparatus may generate demand information based on the working data of the respective stand-alone devices; synchronizing the demand information to the dispatching apparatus which generates a dispatching instruction based on the demand information and state information of the AGV device; and sending the dispatching instruction to one or more target AGV devices which determine a first stand-alone device and a second stand-alone device corresponding to the target AGV devices according to the dispatching instruction and which transport a target yarn spindle to be transported from the first stand-alone device to the second stand-alone device. Here, the first stand-alone device is any one of the plurality of stand-alone devices, and the second stand-alone device is any one of the plurality of stand-alone devices other than the first stand-alone device. Exemplarily, the target AGV device plans an optimal route based on a current position and a position of the first stand-alone device, and drives from the current position to the position of the first stand-alone device based on the optimal route. Here, the target AGV device may be an AGV device located in a parking lot, or may be an AGV device located on the production line. Here, the target AGV device may be a device that has finished a current transportation task, and upon receipt of a new dispatching instruction, the target AGV device plans an optimal route based on a current position and a location of the first stand-alone device and drives from the current position to the position of the first stand-alone device based on the optimal route. Here, the target AGV device may be a device that is executing a transportation task, and upon receipt of a new dispatching instruction, the target AGV device completes the transportation task being executed first and once the transportation task being executed is completed, executes a new transportation task based on the new dispatching instruction.

In some implementations, the demand information may include the number of target AGV devices. The number of AGV devices required by each stand-alone device is calculated according to the number of yarn spindles for which the packaging task corresponding to each stand-alone device is completed. Exemplarily, according to the number of yarn spindles that the packaging has been completed and the number of yarn spindles that the packaging has not been completed in the working data of the stand-alone device, the number of AGV devices required for a task of transporting a stand-alone device A and a stand-alone device B is calculated, or the number of times of a single AGV device travelling between the stand-alone device A and the stand-alone device B (denoted as Task 1) is calculated. For example, a scheme of the Task 1 may be to configure three AGV devices (namely, Device 1, Device 2 and Device 3) for the Task 1, or to configure one AGV device (Device 4) for the Task 1 and the Device 4 is configured with three repeated travels by the dispatching apparatus, i.e., the Device 4 needs to perform three times of an operation of transporting different target yarn spindles from the stand-alone device A to the stand-alone device B.

In some implementations, the demand information may include a route generated from working data of a plurality of stand-alone devices. Specifically, working data of a plurality of stand-alone devices are obtained; a first stand-alone device and a second stand-alone device are determined corresponding to a plurality of tasks, respectively, based on the working data of the plurality of stand-alone devices; position information of a plurality of first stand-alone devices and a plurality of second stand-alone devices is acquired, wherein the position information can be obtained from a map database of control apparatus; and a plurality of routes to be dispatched are generated based on the position information, and the routes can be selected and adjusted as desired.

Here, the demand information may also include multi-thread task data delivered at the same time and task data of a plurality of AGV devices delivered at the same time.

In some implementations, the state information of the AGV device may include a state-of-charge of the AGV device, a remaining operating time of the AGV device, and a current state of the AGV device. Here, the remaining operating time may be calculated based on the current state-of-charge; the current state includes, but is not limited to, states of "AGV device in storage", "AGV device ready for operation", "AGV device in operation", "AGV device ready for charging", "AGV device in charging", "AGV device fully charged", and "AGV device in failure".

In some implementations, the dispatching instruction may include a plurality of sub-instructions for dispatching a target AGV device. The dispatching instruction may include data such as an Identity Document (ID) and location information of the first stand-alone device and the second stand-alone device; the dispatching instruction may further include multiple navigation routes. For example, the target AGV device 1 travels from the first-floor parking lot to the weighing device AA in a first area, transports the yarn spindle to be transported at the weighing device AA to the appearance inspection device BB in the first area, and returns to the first-floor parking lot after the task is finished. The dispatching instruction may also include a travel speed of the target AGV device, which may be set as desired. Here, the travel speed is required to keep within a safe travel range, which is calculated by the control apparatus.

Here, kinds of the target yarn spindle include, but are not limited to: Draw Textured Yarn (DTY), Pre-Oriented Yarn (POY), and Fully Drawn Yarn (FDY).

In some implementations, the control apparatus 10 is specifically configured to: acquire data of a target yarn spindle to be packaged, wherein the data includes data such as quantity, batch number, predicted completion time, urgent or not, quality requirement and the like; acquire a packaging requirement of the target yarn spindle based on the data; determine a plurality of stand-alone devices for packaging the target yarn spindle based on the packaging requirement and packaging tasks corresponding to the stand-alone devices, respectively; and send the packaging tasks to the corresponding stand-alone devices. Here, the target yarn spindles generally are the same type of yarn spindles, and the same type of yarn spindles has the same product parameters, such as batch number, specification and grade. Here, the target yarn spindle may also be different types of yarn spindles, and the different types of yarn spindles may have different product parameters, such as weight, lineal density, color absorption and crimp shrinkage.

In some implementations, the control apparatus 10 is further specifically configured to: acquire working data of each stand-alone device within a first preset time, wherein the working data includes a working state of each stand-alone device, the number of yarn spindles that have been packaged and the number of yarn spindles that have not been packaged; and generate demand information based on the working data, wherein the demand information is used for instructing the dispatching apparatus to generate a dispatching instruction.

In some implementations, the dispatching apparatus 20 is specifically configured to generate the dispatching instruction based on the demand information generated by the control apparatus and the state information of the plurality of AGV devices, wherein the dispatching instruction includes information such as dispatching route, dispatching task and dispatching time; the dispatching instruction is used to instruct a plurality of target AGV devices to perform a transport task.

Here, the control apparatus and the dispatching apparatus may be integrated into a single electronic device or may be integrated into different electronic devices, and the dispatching apparatus may communicate with the AGV device.

In some implementations, the target AGV device 40 is specifically configured to receive the dispatching instruction sent from the dispatching apparatus, wherein the dispatching instruction includes a plurality of sub-instructions corresponding to IDs of the AGV devices; determine a sub-instruction corresponding to the current AGV device; determine a first stand-alone device and a second stand-alone device based on the sub-instruction and transport the target yarn spindle to be transported from the first stand-alone device to the second stand-alone device. Here, the first stand-alone device is any one of the plurality of stand-alone devices, and the second stand-alone device is any one of the plurality of stand-alone devices other than the first stand-alone device.

In some implementations, the target device AGV device 40 is further specifically configured to determine, upon receipt of a control instruction, a transmission mechanism matched with the target yarn spindle to be transported. The AGV device is provided with the transmission mechanism, which is adjustable (such as extended or retracted), so as to better apply to a different number of trays. A size of the tray is also adjustable. Under the condition that the yarn spindles having different types are not packaged simultaneously, size information of yarn spindle corresponding to the target yarn spindle to be packaged is obtained; a state of the tray is adjusted according to the size information of yarn spindle; and the tray is used for seat the yarn spindle.

In some implementations, the robot takes the target yarn spindle off the trolley by a mechanical arm and seat the target yarn spindle on the tray. The robot may be a device having the mechanical arm. Specifically, grabbing force, grabbing angle, grabbing number and grabbing distance, for example, of the robot can be adjusted according to the packaging requirement of the target yarn spindle.

In some implementations, the weighing device may have a built-in weighing instrument and obtain weight data of the yarn spindle by grabbing the yarn spindle on the tray; the weight data of the yarn spindle is uploaded to the control apparatus.

In some implementations, the appearance inspection device may include a plurality of cameras. The camera can be grouped into a close-up camera and a wide-angle camera. Specifically, the close-up camera is used to detect details of the target yarn spindle, such as presence or absence of slight damage or oil stain; the wide-angle camera is used to detect a whole of the target yarn spindle, such as a shape of the target yarn spindle.

In some implementations, the bagging device is used to sleeve a packaging bag over a surface of the target yarn spindle, wherein the frequency and other parameters of the bagging device can be adjusted based on the packaging requirement of the target yarn spindle.

In some implementations, the strapping device is used to strap the palletized yarn spindles, wherein a length of required packaging bags can be adjusted according to a stack size in the packaging task.

In some implementations, the labeling device is used to attach a label on a side of the whole stack of yarn spindles, wherein the position where the label is attached can be adjusted according to the packaging requirement of the target yarn spindle.

In some implementations, the plurality of stand-alone devices may also include an elevator and/or a shuttle vehicle. Specifically, the elevator is used to convey an empty trolley to a floor where the production line of the yarn spindle packaging is located according to a first control instruction sent from the control apparatus. Here, the first control instruction may be determined according to position information of the target yarn spindle, and the first control instruction may be used to instruct the elevator to operate. Exemplarily, if the production line of the yarn spindle packaging is on the first floor and the empty trolley is on the second floor, the elevator may convey the empty trolley from the second floor to the first floor. Exemplarily, if the production line of the yarn spindle packaging is on the second floor and the empty trolley is on the first floor, the elevator may convey the empty trolley from the first floor to the second floor. The shuttle vehicle is used to convey a tray matched with a target type of the yarn spindle to a feeding station according to a second control instruction sent from the control apparatus, and the feeding station is a first station for packaging the yarn spindle. Here, the second control instruction may be used to instruct the shuttle vehicle to operate.

As such, it is possible to generate the demand information based on the working data returned by the stand-alone devices, generate the dispatching instruction according to the demand information, achieve intelligent transportation among the stand-alone devices by dispatching the AGV device through the dispatching instruction, improve the intelligentization and flexibility of the yarn spindle packaging, and improve efficiency of the yarn spindle packaging accordingly.

In the embodiment of the disclosure, the dispatching apparatus 20 is further configured to, for yarn spindles to be packaged with a same batch number, assign an AGV device to a plurality of stand-alone devices, and dispatch the AGV device to transport the yarn spindles to be packaged among the stand-alone devices.

In the embodiment of the disclosure, the dispatching apparatus 20 is further configured to, for yarn spindles to be packaged with a same batch number, assign an AGV device to every two adjacent stand-alone devices in a plurality of stand-alone devices, and dispatch the plurality of AGV devices to transport the yarn spindles to be packaged among the plurality of stand-alone devices.

In some implementations, the AGV device is used to transport or convey the target yarn spindle to the target stand-alone device.

In some implementations, for the whole packaging process, each type of yarn spindle needs to sequentially pass a plurality of stand-alone devices on the production line of the yarn spindle packaging. In other words, each target type of yarn spindle needs to pass a plurality of packaging links, and each stand-alone device corresponds to a packaging link. For example, the stand-alone devices that POY yarn spindle needs to pass at least include: a robot, a weighing device, an appearance inspection device, a bagging device, a palletizing device, a strapping device and a labeling device, wherein passing the robot belongs to a link of seating a yarn spindle on an empty tray; passing the weighing device belongs to a weighing link; passing the appearance inspection device belongs to an appearance inspecting link; passing the bagging device belongs to a bagging link; passing the palletizing device belongs to a palletizing link; passing the strapping device belongs to a strapping link; passing the labeling device belongs to a link of printing and attaching a label. The packaging progress can be understood as follows: the current location of the stand-alone device (i.e., the current link) of the POY yarn spindle. Exemplarily, the target yarn spindle passes the appearance inspection device, which means that the packaging progress of the target yarn spindle is at the appearance inspection link. The wording data of the stand-alone devices may be uploaded to the control apparatus. The control apparatus generates demand information based on the working data of the stand-alone devices and sends the demand information to the dispatching apparatus. The dispatching apparatus generates a dispatching instruction based on the demand information, and dispatches a plurality of target AGV devices to transport the yarn spindle processed by the first stand-alone device to the second stand-alone device based on the dispatching instruction.

The working data of each stand-alone device can be uploaded to the control apparatus in real time, so that the control apparatus can monitor the packaging progress of the target yarn spindle in real time, and then the AGV device can be dispatched in time; the control apparatus may also temporarily adjust the transportation task of the AGV device based on the working data of the stand-alone device.

For example, a certain packaging factory area includes four areas, which are denoted as a first area, a second area, a third area and a fourth area, respectively, wherein the first area, the second area and the third area are a yarn spindle packaging workshop, and the fourth area is a storehouse of AGV devices; in the first area, a plurality of first type of stand-alone devices for packaging POY yarn spindles are placed; in the second area, a plurality of second type of stand-alone devices for packaging the DTY yarn spindles are placed; in the third area, a plurality of third type of stand-alone devices for packaging FDY yarn spindles are placed. Exemplarily, a first batch of the yarn spindles to be packaged in the first area reaches a first stand-alone device, i.e., a robot, in the first area; when the robot grabs the yarn spindles to be packaged off the trolley, the stand-alone device robot uploads working data to the control apparatus, and the working data includes the number of the yarn spindles to be packaged; the control apparatus generates demand information based on the working data uploaded by the robot, and the demand information can be obtained by calculating the working data; the demand information is sent to the dispatching apparatus so that the dispatching apparatus can generate a dispatching instruction; the dispatching apparatus issues the dispatching instruction to a target AGV device which is used for transporting the yarn spindle to be packaged among a plurality of stand-alone devices; for example, the target AGV device waits in a finishing area of the robot and transports the yarn spindle gripped by the robot to a starting area of the weighing device; waits in a finishing area of the weighing device and transports the weighed yarn spindle to a starting area of the appearance inspection device; waits in a finishing area of the appearance inspection device and transports the yarn spindle completed by the appearance inspection device to a starting area of the bagging device; waits in a finishing area of the bagging device and transports the yarn spindle completed by the bagging device to a starting area of the palletizing device; waits in a finishing area of the palletizing device and transports the yarn spindle completed by the palletizing device to a starting area of the strapping device; waits in a finishing area of the strapping device and transports the yarn spindle completed by the strapping device to a starting area of the labeling device; waits in a finishing area of the labeling device and warehouses the packaged yarn spindle; if no other tasks, the target AGV device will return to the fourth area for standby; and if the presence of a second task is detected, the target AGV device will continue to execute the second task. Or, the first batch of yarn spindles to be packaged in the first area, the first batch of yarn spindles to be packaged in the second area and the first batch of yarn spindles to be packaged in the third area simultaneously reach first stand-alone devices, i.e., robots, in the respective areas; a first robot in the first area, a second robot in the second area and a third robot in the third area simultaneously grab the yarn spindle to be packaged off trolleys; the first robot, the second robot and the third robot simultaneously upload working data to the control apparatus; the control apparatus generates demand information based on the working data uploaded by the plurality of robots, and the demand information can be obtained by calculating the working data; the demand information is sent to the dispatching apparatus so that the dispatching apparatus can generate a dispatching instruction; the dispatching apparatus issues the dispatching instruction to a plurality of target AGV devices (denoted as AGV device 1 to AGV device 3) which are used to transport the yarn spindle to be packaged between two adjacent stand-alone devices; for example, the AGV device 1 is used to wait in a finishing area of the robot in the first area and transports the yarn spindle grabbed by the robot to a starting area of the weighing device; then travels from the starting area of the weighing device in the first area to a finishing area of the robot in the second area to wait, and transports the yarn spindle grabbed by the robot in the second area to a starting area of the weighing device in the second area; then travels from the starting area of the weighing device in the second area to a finishing area of the robot in the third area to wait, and transports the yarn spindle grabbed by the robot in the third area to a starting area of the weighing device in the third area; and then travels from the starting area of the weighing device in the third area to the fourth area to wait for the second task. Or, the AGV device 1 is used to wait in a finishing area of the robot in the first area, and transports the yarn spindle grabbed by the robot in the first area to a starting area of the weighing device in the first area; the AGV device 2 is used to wait in a finishing area of the robot in the second area, and transports the yarn spindle grabbed by the robot in the second area to a starting area of the weighing device in the second area; the AGV device 3 is used to wait in a finishing area of the robot in the third area, and transports the yarn spindle grabbed by the robot in the third area to a starting area of weighing device in the third area. In such a manner, it is advantageous to improve the intellectualization of the yarn spindle packaging, and is also beneficial to improve the quality and the efficiency of the yarn spindle packaging.

In the embodiment of the disclosure, each dispatching apparatus 20 is further configured to: under the condition that different types of yarn spindles are simultaneously packaged, assign an AGV device to each type of yarn spindle, and dispatch the AGV device matched with a target type of yarn spindle to transport the target type of yarn spindle among the plurality of stand-alone devices; or under the condition that different types of yarn spindles are simultaneously packaged, assign a plurality of AGV devices to each type of yarn spindle, and dispatch the plurality of AGV devices matched with a target type of yarn spindle to transport the target type of yarn spindle among the plurality of stand-alone devices.

For example, a certain packaging factory area includes three areas, which are denoted as a fifth area, a sixth area and a seventh area, respectively, wherein in the fifth area, a plurality of first type of stand-alone devices for packaging POY yarn spindles are placed; in the sixth area, a plurality of second type of stand-alone devices for packaging the DTY yarn spindles are placed; in a seventh area, a plurality of AGV devices are placed; and the plurality of AGV devices in the seventh area may provide transport services for the yarn spindle packaging in the fifth and sixth areas. Exemplarily, the same batch of POY yarn spindles to be packaged and DTY yarn spindles to be packaged simultaneously reach a first stand-alone device, i.e., robot, in the fifth and sixth areas; the robot grabs the yarn spindle to be packaged on a trolley and sends working data to the control apparatus; the control apparatus generates demand information based on the working data uploaded by the robot, and the demand information is obtained by calculating the working data; the demand information is sent to the dispatching apparatus so that the dispatching apparatus generates a dispatching instruction; the dispatching apparatus issues the dispatching instruction to two target AGV devices (denoted as AGV device 8 and AGV device 9), wherein the AGV device 8 is an AGV device corresponding to the POY yarn spindles to be packaged in the fifth area, which is used to transport the yarn spindles among a plurality of stand-alone devices in the fifth area; the AGV device 9 is an AGV device corresponding to the DTY yarn spindled to be packaged in the sixth section, which is used to transport the yarn spindle among a plurality of stand-alone devices in the sixth section. Or, the control apparatus generates demand information based on working data uploaded by the robot, and sends the demand information to the dispatching apparatus so that the dispatching apparatus generates a dispatching instruction; the dispatching apparatus issues the dispatching instruction to a plurality of target AGV devices (denoted as AGV device 10 to AGV device 15); specifically, the AGV devices 10, 11, and 12 are AGV devices corresponding to the POY yarn spindles to be packaged in the fifth area, which are used to transport the yarn spindles among a plurality of stand-alone devices in the fifth area; and the AGV devices 13, 14, and 15 are AGV devices corresponding to the DTY yarn spindles to be packaged in the sixth area, which are used to transport the yarn spindles among a plurality of stand-alone devices in the sixth area.

In such a manner, it is possible to generate the different dispatching schemes of the AGV device according to the type and the number of the yarn spindles to be packaged, thereby guaranteeing the quality and the efficiency of the yarn spindle packaging. Further, it is possible to match the different types of the yarn spindles with the corresponding AGV devices, advantageously avoiding damaging caused by the mismatching between the AGV device and the yarn spindle type in process of transporting the yarn spindles and further providing support for the simultaneous packaging of the yarn spindles with varied types.

In the embodiment of the disclosure, the dispatching apparatus 20 is further configured to determine, upon receipt of alarm information sent from a first target AGV device, a second target AGV device in place of the first target AGV device; and send the dispatching instruction to the second target AGV device so that the second target AGV device transports the target yarn spindle to be transported from the first stand-alone device to the second stand-alone device based on the dispatching instruction.

In some implementations, when the first target AGV device is in a power shortage state, a fault state, a shutdown state, for example, the first target AGV device generates the alarm information and sends the alarm information to the control apparatus, wherein the alarm information may include information on a state of the AGV device, a position of the first target device and uncompleted tasks of the first target device, for example; the control apparatus generates a dispatching instruction based on the alarm information of the first target AGV device and determines the second target AGV device; the control apparatus sends the dispatching instruction to the second target AGV device so that the second target AGV device transports the target yarn spindles to be transported from the first stand-alone device to the second stand-alone device based on the dispatching instruction, wherein the second AGV device may be an AGV device that is in an idle state and closest to the first AGV device.

In some implementations, the first target AGV device may send the alarm information to the control apparatus, which may be displayed on a display of the control apparatus; when the control apparatus detects the alarm information, the control apparatus can display prompt information, and the prompt information can prompt a failure of the AGV device by way of sound, light, texts and the like.

In such a manner, it is possible to send the alarm information to the control apparatus in time, such that the control apparatus advantageously enables overall planning and control over the plurality of AGV devices, thereby improving a speed of yarn spindle packaging.

In the embodiment of the disclosure, different AGV devices can be applicable to different states of the yarn spindles; the dispatching apparatus 20 is further configured to: determine a state of the target yarn spindle to be transported; and determine the target AGV device based on the state.

In some implementations, the AGV devices may be grouped into a first type of AGV device, a second type of AGV device, and a third type of AGV device by different types of yarn spindles; the first type of AGV device is used for transporting DTY yarn spindle, the second type of AGV device is used for transporting POY yarn spindle, and the third type of AGV device is used for transporting FDY yarn spindle. The AGV devices can be grouped into a first flow AGV device, a second flow AGV device, a third flow AGV device, a fourth flow AGV device, a fifth flow AGV device, a sixth flow AGV device and a seventh flow AGV device by the yarn spindles in different states; the first flow AGV device is used for transporting the yarn spindles between the robot and the weighing device, the second flow AGV device is used for transporting the yarn spindles between the weighing device and the appearance inspection device, the third flow AGV device is used for transporting the yarn spindles between the appearance inspection device and the bagging device, the fourth flow AGV device is used for transporting the yarn spindles between the bagging device and the palletizing device, the fifth flow AGV device is used for transporting the yarn spindles between the palletizing device and the strapping device, the sixth flow AGV device is used for transporting the yarn spindles between the strapping device and the labeling device, and the seventh flow AGV device is used for transporting the yarn spindles processed by the labeling device to the product storehouse.

Here, the plurality of flow AGV devices may be unidirectional, i.e., the target yarn spindle to be transported is transported from the first stand-alone device to the second stand-alone device, and the processing flow of the first stand-alone device is prior to the processing flow of the second stand-alone device; the plurality of flow AGV devices can also be reversed, i.e., the target yarn spindle to be transported is transported from the second stand-alone device to the first stand-alone device, and the processing flow of the first stand-alone device is prior to the processing flow of the second stand-alone device; the plurality of flow AGV devices may also be bidirectional, i.e., the target yarn spindle to be transported may be transported from the first stand-alone device to the second stand-alone device, or the target yarn spindle to be transported may be transported from the second stand-alone device to the first stand-alone device.

In such a manner, it is possible to group the AGV devices into multiple types according to the yarn spindles in different states and execute transportation tasks of the yarn spindles in different states by the different AGV devices, respectively, advantageously realizing the intelligent yarn spindle packaging system.

In the embodiment of the disclosure, the dispatching apparatus 20 is further configured to, under the condition that different types of yarn spindles are simultaneously packaged, if an AGV device in an idle state does not meet the demand information, assign the AGV device to a yarn spindle packaging task with a high priority according to packaging progresses of the different types of yarn spindles.

In some implementations, under the condition that the first type of yarn spindle and the second type of yarn spindle are processed simultaneously, if the weighing device of the first type of yarn spindle needs 2 AGV devices, the appearance inspection device needs 1 AGV device, and the strapping device needs 2 AGV devices, the weighing device of the second type of yarn spindle needs 5 AGV devices; the appearance inspection device needs 3 AGV devices, and the palletizing device needs 2 AGV devices. The control apparatus detects that there are only 3 idle AGV devices placing in the storehouse; evaluates a priority between the first type of yarn spindle and the second type of yarn spindle and a priority between the processing flow of the first type of yarn spindle and the processing flow of the second type of yarn spindle, to obtain a priority evaluation result, wherein the priority evaluation result is that the first type of yarn spindle has a priority higher than the second type of yarn spindle, and in the processing flow of the first type of yarn spindle, the weighing device has a priority higher than the appearance inspection device further higher than the strapping device; dispatches the idle AGV devices to the weighing device and the appearance inspection device of the first type of yarn spindle.

In some implementations, the yarn spindles with different types of have different priorities; the yarn spindles with different packaging requirements have different priorities; different processing flows of different yarn spindles have different priorities. Here, the priority may be adjusted according to the demand information of the yarn spin, and the priority of different processing flows of different yarn spindles may be fixed or may be adjusted according to the demand information.

In such a manner, by determining the different priorities of different types and different processing flows according to the demand information, the control apparatus advantageously enables overall planning and control throughout the whole production line of the yarn spindle packaging, thereby improving the efficiency of yarn spindle packaging.

In the embodiment of the disclosure, the control apparatus 10 is further configured to: receive respective use information corresponding to the plurality of AGV devices sent from the dispatching apparatus; and adjust the device control parameter and the packaging task of each stand-alone device based on the use information and the working data returned by each stand-alone device.

In some implementations, the use information for the plurality of AGV devices may include: the amount of yarn spindles transported by each AGV device in a first time period, a used time period of each AGV device in the time period, an unused time period of each AGV device in the time period, and a frequency of each AGV device transporting the yarn spindles in the first time period, for example, each AGV device completes a transportation task every minute. The use information of the plurality of AGV devices can be automatically generated and uploaded to the dispatching apparatus upon receipt of an acquisition request of the dispatching apparatus. Alternatively, the use information of the plurality of AGV devices is actively uploaded to the dispatching apparatus. Here, the dispatching apparatus receives the use information uploaded by the AGV devices, processes the use information uploaded by the AGV devices, and transmits the processed use information to the control apparatus.

In the embodiment of the disclosure, the control apparatus is specifically configured to send a first acquisition request to the dispatching apparatus and the plurality of stand-alone devices, the first acquisition request being used for indicating the dispatching apparatus to upload the use information of the plurality of AGV devices in a first time period and indicating each stand-alone device to upload the working data in the first time period; receive the use information of the plurality of AGV devices uploaded by dispatching apparatus in the first time period and the working data uploaded by each stand-alone device in the first time period; adjust the device control parameters and the packaging tasks of each stand-alone device in the second time period based on the use information of the plurality of AGV devices in the first time period and the working data uploaded by each stand-alone device in the first time period;

the dispatching apparatus is specifically configured to send a second acquisition request to the plurality of AGV devices when detecting the first acquisition request, the second acquisition request being used for indicating the plurality of AGV devices to upload the use information in the first time period; process the use information uploaded by the plurality of AGV devices in the first period of time, and send the to the control apparatus;

the plurality of AGV devices are specifically configured to upload the use information in the first time period to dispatching apparatus;

each stand-alone device is specifically configured to upload the working data in the first time period to the control apparatus; and perform an operation based on the device control parameters and the packaging tasks of each stand-alone device in the second time period.

Here, the first period is a past time, and the second period is a future time.

In such a manner, by adjusting the device control parameters and the packaging tasks of each stand-alone device according to the working data of the AGV device and each stand-alone device in the first time period, it is advantageous to improve the intelligentization and the flexibility of the yarn spindle packing system, thereby improving the efficiency of yarn spindle packaging.

In the embodiment of the disclosure, the dispatching apparatus 20 is further configured to acquire dispatching data in a first time period; input the dispatching data in the first time period into a dispatching model to acquire a dispatching data prediction value in a second time period output by the dispatching model, the dispatching model being obtained by training a dispatching data sample and being used for predicting the dispatching data; determine candidate AGV devices from the plurality of AGV devices based on the dispatching data prediction value; and determine, upon receipt of the demand information, the target AGV device from the candidate AGV devices based on the demand information.

Here, the candidate AGV devices may be plural, and the target AGV device may be one or plural.

In some implementations, the training process of the dispatching model may include: acquiring training data, wherein the training data are a plurality of AGV use information samples and working data samples of each stand-alone device; and training a model to be trained based on the training data to obtain the dispatching model. The dispatching model is used to predict the dispatching data for a period of time to determine the target AGV device from the candidate AGV devices based on the dispatching data.

In the embodiment of the disclosure, the manner of acquiring the plurality of the AGV use information samples and the working data samples of the stand-alone device is not limited.

In such a manner, by predicting the dispatching data of the next time period by the dispatching model, it is possible to determine the dispatching scheme in advance, advantageously improving the intelligentization and flexibility of the yarn spindle packaging system, improving the effective utilization rate of AGV device, and further improving the speed of yarn spindle packaging.

In the embodiment of the disclosure, the AGV device 40 includes a controller and a transport mechanism, wherein the transport mechanism is used for bearing the yarn spindle; and the controller is used for determining a target parameter adaptive to the target yarn spindle to be transported based on the dispatching instruction; and adjusting the transport mechanism based on the target parameter so that the adjusted transport mechanism is adaptive to the target yarn spindle to be transported.

In some implementations, the transport mechanism of the AGV device can be adjusted according to different states of the yarn spindle, such that one AGV device may be transformed into an AGV device suitable for different states of the yarn spindle at different times. Since the yarn spindles on the transport mechanisms of the AGV devices have different states in different process stages, the transport mechanisms of the AGV devices have different states in the different process stages. For example, some transport mechanisms have trays placed while some transport mechanisms have no trays placed. A size of the transport mechanism can be adjusted. Both of a length and a width of the transport mechanism can be adjusted for the yarn spindles at different states.

Figure 3:
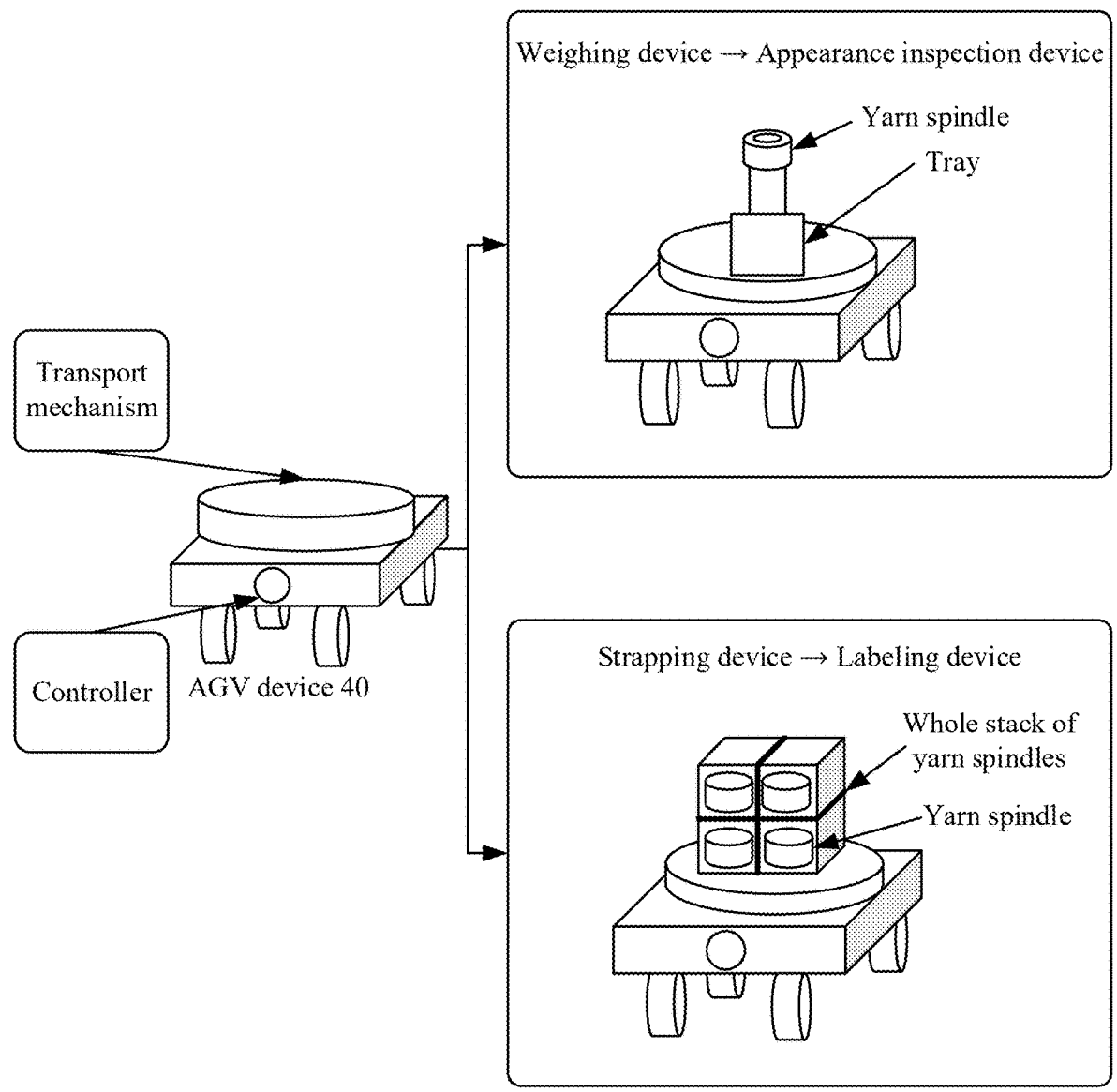
FIG. 3 is a schematic view of a transport mechanism of an AGV device in accordance with the embodiment of the present disclosure while transporting a yarn spindle in different states.

FIG. 3 is a schematic view of a transport mechanism of an AGV device while transporting a yarn spindle in different states. As shown in FIG. 3, the AGV device mainly includes a controller and a transport mechanism. When the yarn spindle processed by the weighing device is transported to the appearance inspection device, a tray for seating the yarn spindle is placed on the transport mechanism. When a whole stack of yarn spindles that has been processed by the strapping device is transported to the labeling device, the transport mechanism has the whole stack of yarn spindles placed thereon. Taking the DTY packaging as an example, DTY is packaged in a small carton, and each small carton is laser-burned after the completion of boxing without subsequent labeling action.

In some implementations, the controller of the AGV device may analyze a dispatching instruction issued by the control apparatus. The controller analyzes the dispatching instruction to obtain a state of the target yarn spindle to be transported; and the transport mechanism of the AGV device is adjusted based on the state of the target yarn spindle to be transported. The state of the target yarn spindle may include the flow processing condition of the target yarn spindle, such as that the weighing device has been processed, the appearance inspection device has been processed, the boxing device has been processed, the labeling device has been processed, and the like.

In such a manner, it is possible to adjust the transport mechanism of the AGV device according to the state of the target yarn spindle, advantageously improving adaptability of the target AGV device and the target yarn spindle so that a single AGV device can provide services for different stand-alone devices at different times and a single AGV device can transport the target yarn spindles in different states at different times, thereby improving the dispatching flexibility and diversity of the yarn spindle packaging system and improving efficiency of the yarn spindle packaging.

In the embodiment of the disclosure, packaging of the different types of the yarn spindles can share the yarn spindle packaging system, that is, share the control apparatus, the dispatching apparatus, the AGV devices and at least part of the stand-alone devices.

In some implementations, in the case where the different types of the yarn spindles do not share the stand-alone devices, an AGV device are assigned and dispatched for each type of yarn spindle according to the packaging process of each type of yarn spindle. The AGV device can be shared, i.e., the AGV device can transport the different types of the yarn spindles in the first area, the second area and the third area, respectively.

In such a manner, the different types of the yarn spindles can share the control apparatus, the dispatching apparatus, the AGV devices and at least part of the stand-alone devices, so that various equipment in the yarn spindle packaging system can be effectively utilized to advantageously improve efficiency of the yarn spindle packaging.

In the embodiment of the disclosure, the plurality of stand-alone devices include a first type of stand-alone device, a second type of stand-alone device and a third type of stand-alone device; the first type of stand-alone device, the second type of stand-alone device and the third type of stand-alone device can be deployed in different areas; the first type of stand-alone device is a stand-alone device suitable for packaging of a DTY yarn spindle, the second type of stand-alone device is a stand-alone device suitable for packaging of a POY yarn spindle, and the third type of stand-alone device is a stand-alone device suitable for packaging of a FDY yarn spindle. The control apparatus may simultaneously control multiple types of stand-alone devices in the factory area, i.e., a control apparatus A may simultaneously control a first type of stand-alone device, a second type of stand-alone device, a third type of stand-alone device and a fourth type of stand-alone device. A single control apparatus may also control a plurality of stand-alone devices of the same type at the same time, i.e., a control apparatus B may control a first type of stand-alone devices a1-ax, a second type of stand-alone devices b1-by, a third type of stand-alone devices c1-cz and a fourth type of stand-alone devices d1-dk at the same time. The three types of stand-alone devices are all deployed in different areas, for example, the first type of stand-alone device is deployed in a first area; the second type of stand-alone device is deployed in a second area; the third type of stand-alone device is deployed in a third area, and the fourth type of stand-alone device is deployed in a fourth area. The first area, the second area and the third area are separated, and the fourth type of stand-alone device is shared by the first area, the second area and the third area, so that the control capability of the control apparatus can be fully utilized, the packaging cost of different types of yarn spindles can be saved, and the confusion of different types of yarn spindles can be effectively avoided. The dispatching apparatus and the plurality of AGV devices can be shared for the first area, the second area, the third area and the fourth area, so that the control capability of the control apparatus can be fully utilized, the plurality of AGV devices be shared by various types of production lines of the yarn spindle packaging, the packaging cost of different types of yarn spindles can be saved, and the confusion of different types of yarn spindles can be effectively avoided.

Figure 4:
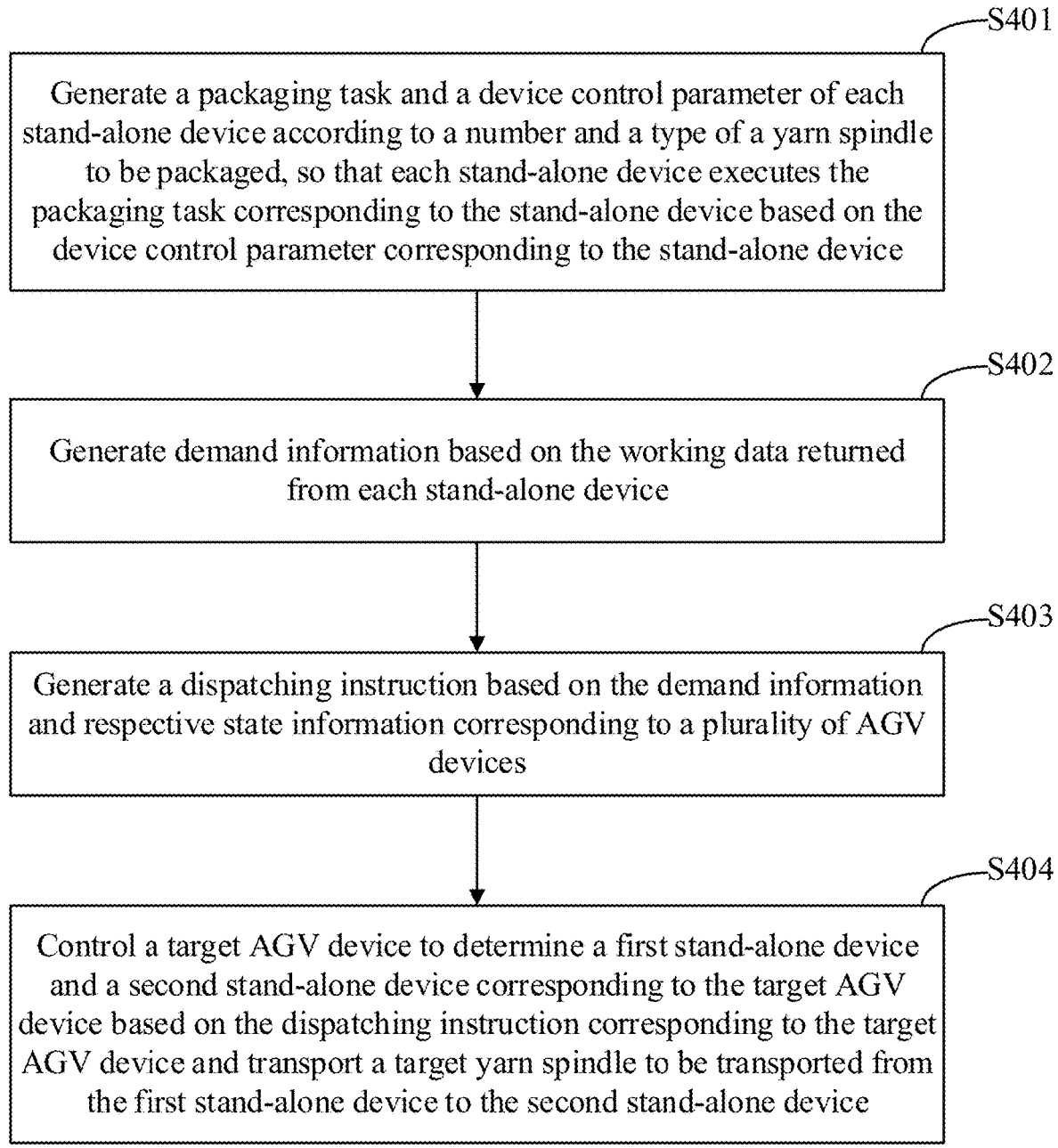
FIG. 4 is a flow chart illustrating a control method of the yarn spindle packaging system in accordance with the embodiment of the present disclosure.

The embodiment of the present disclosure provides a control method of a yarn spindle packaging system. FIG. 4 is a flow chart illustrating the control method of the yarn spindle packaging system in accordance with the embodiment of the present disclosure, and the control method of the yarn spindle packaging system can be applied to a control apparatus of the yarn spindle packaging system. The control apparatus of the yarn spindle packaging system is disposed in an electronic device. The electronic device includes, but is not limited to, a fixed device and/or a mobile device. For example, the fixed device includes, but is not limited to, a server, which may be a cloud server or a general server. For example, the mobile device includes, but is not limited to, a cell phone, a tablet computer, and the like. In some possible implementations, the control method of the yarn spindle packaging system may also be implemented by a processor invoking a computer readable instruction stored in a memory. As shown in FIG. 4, the control method of the yarn spindle packaging system includes:

S401: generating a packaging task and a device control parameter of each stand-alone device according to a number and a type of a yarn spindle to be packaged, so that each stand-alone device executes the packaging task corresponding to the stand-alone device based on the device control parameter corresponding to the stand-alone device;

S402: generating demand information based on the working data returned from each stand-alone device;

S403: generating a dispatching instruction based on the demand information and respective state information corresponding to a plurality of AGV devices; and S404: controlling a target AGV device to determine a first stand-alone device and a second stand-alone device corresponding to the target AGV device based on the dispatching instruction corresponding to the target AGV device and transporting a target yarn spindle to be transported from the first stand-alone device to the second stand-alone device.

Herein, the yarn spindle packaging system adopts the yarn spindle packaging system according to any one of the above embodiments.

In some implementations, the demand information may be demand information generated according to a type of the yarn spindle. Specifically, since the different types of yarn spindles may have different sizes, weights and defective ratios, for example, it is necessary to generate independent demand information for each type of yarn spindle, respectively. The demand information includes demand information for the AGV device required by each type of yarn spindle, and specifically includes quantity demand information.

In some implementations, types of the target yarn spindle include at least one of: DTY, POY, and FDY.

In some implementations, the dispatching apparatus may receive a dispatching instruction directly input by an operator on a control panel of the electronic device, or may also receive a dispatching instruction transmitted by the operator through a terminal. The dispatching apparatus can also automatically generate the dispatching instruction based on the dispatching model. For example, the dispatching model can automatically generate the dispatching instruction based on the information of the number of the yarn spindles, the type of the yarn spindles, the scheduled ex-warehouse time and the like. The dispatching model may generate the dispatching instruction based on the demand information. The dispatching instruction may be embodied in a form of text description, or may be embodied in a form of dispatching data. The embodiment of the disclosure does not limit training of the dispatching model.

Figure 5:
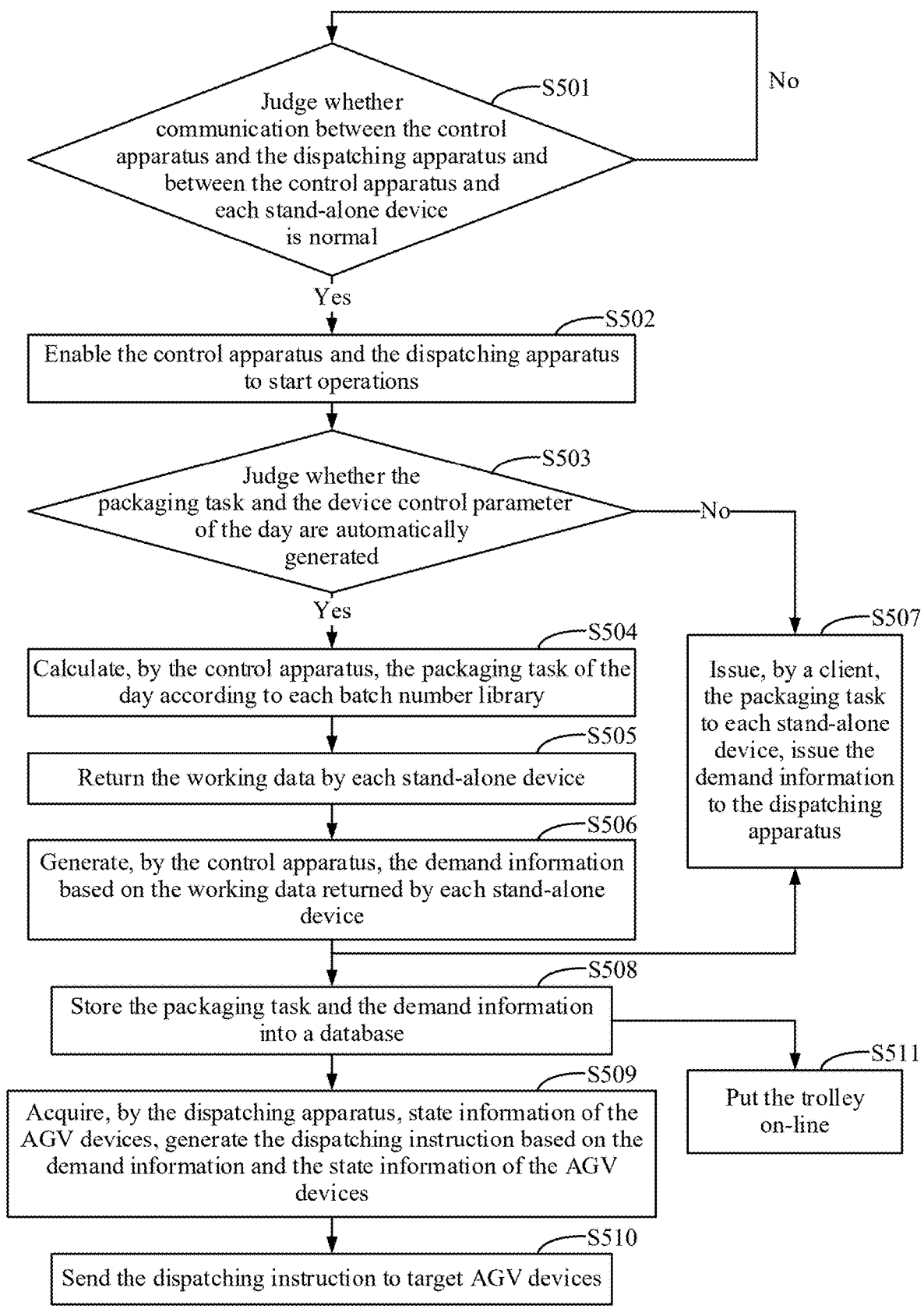
FIG. 5 is a first flowchart of a yarn spindle packaging in accordance with the embodiment of the present disclosure.

FIG. 5 is a first flowchart of a yarn spindle packaging. As shown in FIG. 5, the processing flow may include:

S501: judging whether communication between the control apparatus and the dispatching apparatus and between the control apparatus and each stand-alone device is normal; if yes, proceeding to S502; otherwise, repeating this step.

Here, the control apparatus may communicate with a Programmable Logic Controller (PLC) of each stand-alone device. Here, the PLC is a digital operation controller having a microprocessor for automation control, and can load a control instruction into a memory at any time to be stored and executed. The stand-alone devices can use a single PLC, and different stand-alone devices correspond to different interfaces on the PLC. Each stand-alone device may also correspond to a respective PLC.

S502: enabling the control apparatus and the dispatching apparatus to start operations;

S503: judging whether the packaging task and the device control parameter of the day are automatically generated; if yes, proceeding to S504; otherwise, proceeding to S507;

S504: calculating, by the control apparatus, the packaging task and the device control parameter of the day according to each batch number library, and then proceeding to S507, wherein the packaging task of the day can be obtained through a packaging task generation model in the step;

S505: returning the working data by each stand-alone device and then proceeding to S506;

S506: generating, by the control apparatus, the demand information based on the working data returned by each stand-alone device, and then proceeding to S507;

S507: issuing, by a client, the packaging task to each stand-alone device, issuing the demand information to the dispatching apparatus, and then proceeding to S508;

S508: storing the packaging task and the demand information into a database, and then proceeding to S509 and S511;

S509: acquiring, by the dispatching apparatus, state information of the plurality of AGV devices, generating the dispatching instruction based on the demand information and the state information of the plurality of AGV devices, and then proceeding to S510, wherein the dispatching instruction is used for dispatching a movement of the target AGV device;

S510: sending the dispatching instruction to a plurality of target AGV devices;

S511: putting the trolley on-line.

Figure 6:
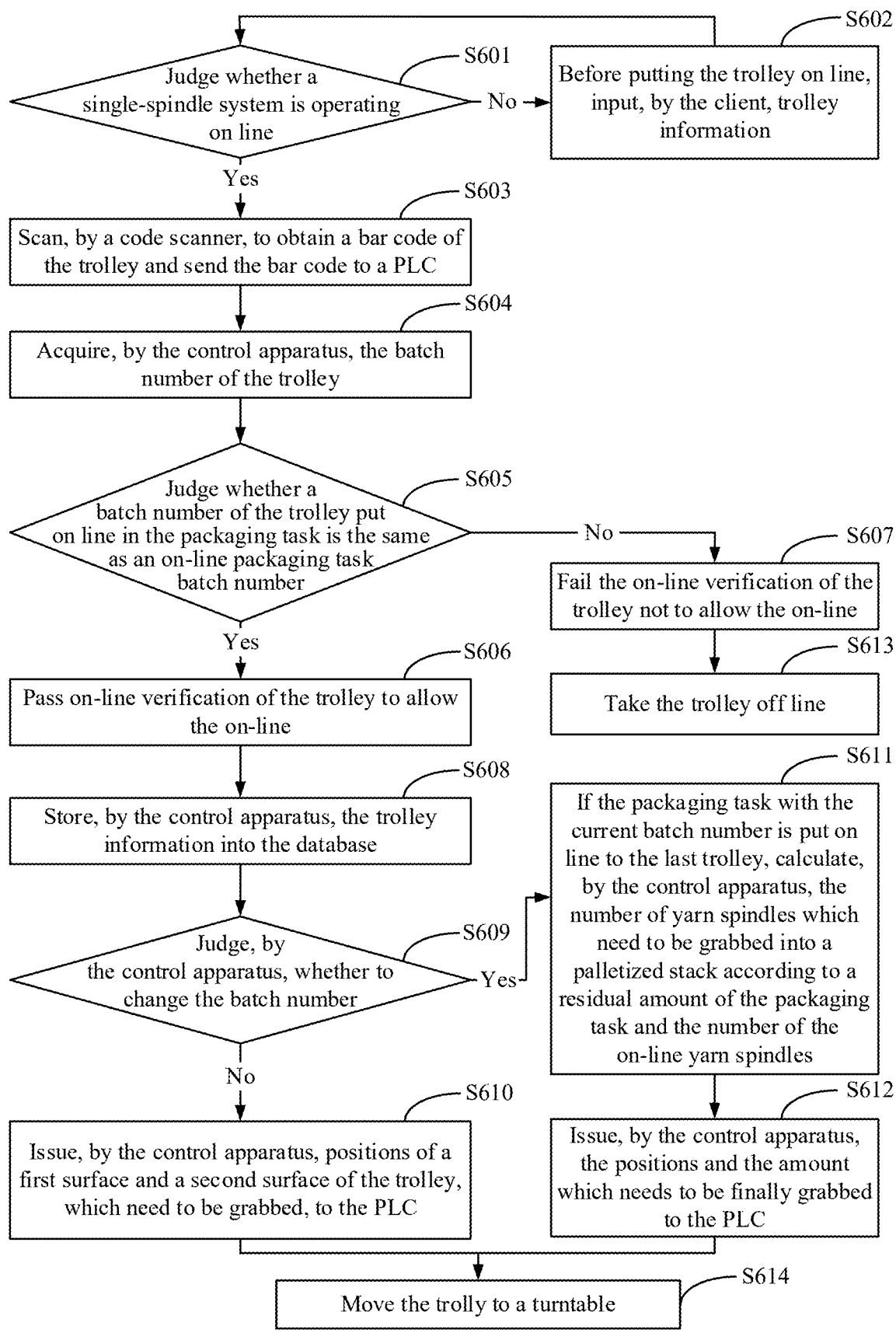
FIG. 6 is a second flowchart of the yarn spindle packaging in accordance with the embodiment of the present disclosure.

FIG. 6 is a second flowchart of the yarn spindle packaging. As shown in FIG. 6, the processing flow may include:

S601: judging whether a single-spindle system is operating on line or not; if yes, proceeding to S603; otherwise, proceeding to S602;

S602: before putting the trolley on line, inputting, by the client, trolley information, wherein the trolley information includes information such as batch number, specification, number of drops, and presence or absence of yarn spindles at all positions on both sides of the trolley;

S603: scanning, by a code scanner, to obtain a bar code of the trolley and sending the bar code to a PLC;

S604: acquiring, by the control apparatus, the batch number of the trolley, wherein the control apparatus acquires the bar code of the trolley, and initiates a query request to a single-spindle system based on the bar code of the trolley to acquire the batch number of the trolley, the presence or absence of yarn spindles at all positions on both sides of the trolley, and the detailed information of the yarn spindle;

S605: judging whether a batch number of the trolley put on line in the packaging task is the same as an on-line packaging task batch number; if yes, proceeding to S606; otherwise, proceeding to S607;

S606: passing on-line verification of the trolley to allow the on-line, and then proceeding to S608;

S607: failing the on-line verification of the trolley not to allow the on-line, and then proceeding to S613;

S608: storing, by the control apparatus, the trolley information into the database;

S609: judging, by the control apparatus, whether to change the batch number; if yes, proceeding to S611; otherwise, proceeding to S610;

S610: issuing, by the control apparatus, positions of a first surface and a second surface of the trolley, which need to be grabbed, to the PLC, and then proceeding to S614;

S611: if the packaging task with the current batch number is put on line to the last trolley, calculating, by the control apparatus, the number of yarn spindles which need to be grabbed into a palletized stack according to a residual amount of the packaging task and the number of the on-line yarn spindles, and then proceeding to S612;

S612: issuing, by the control apparatus, the positions and the amount which needs to be finally grabbed to the PLC, and then proceeding to S614;

S613: taking the trolley off line;

S614: moving the trolly to a turntable.

Figure 7:
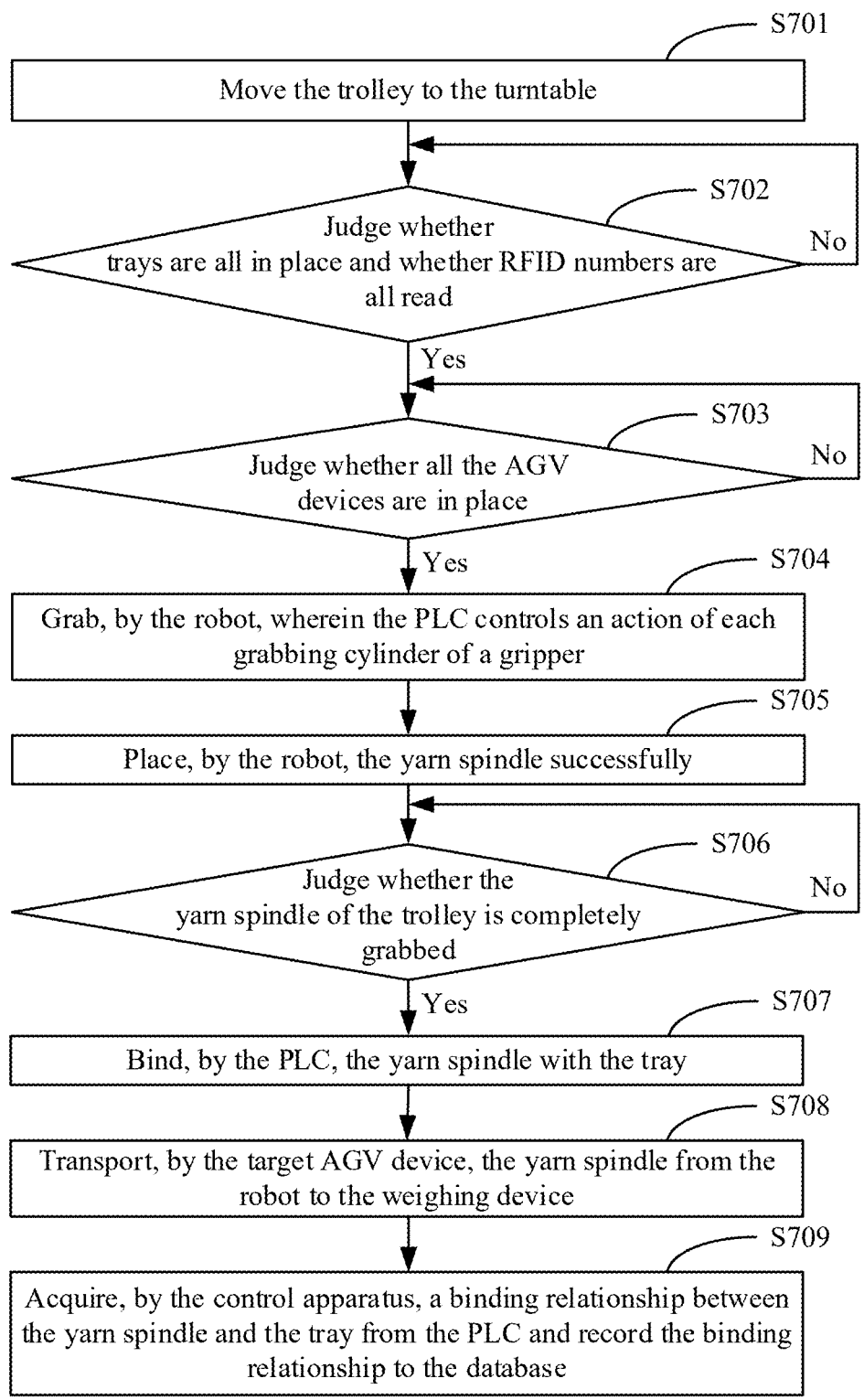
FIG. 7 is a third flowchart of the yarn spindle packaging in accordance with the embodiment of the present disclosure.

FIG. 7 is a third flowchart of the yarn spindle packaging. As shown in FIG. 7, the processing flow may include:

S701: moving the trolley to the turntable;

S702: judging whether trays are all in place or not and whether Radio Frequency Identification (RFID) numbers are all read or not; if yes, proceeding to S703; otherwise, repeating S702;

S703: judging whether all the AGV devices are in place or not, if yes, proceeding to S704; otherwise, repeating S703;

S704: grabbing, by the robot, wherein the PLC controls an action of each grabbing cylinder of a gripper;

wherein the PLC controlling the action of each grabbing cylinder includes: the cylinder taking an action facing a position of the trolley having a yarn spindle, and the cylinder taking no action facing a position of the trolley having no yarn spindle;

S705: placing, by the robot, the yarn spindle successfully;

S706: judging whether the yarn spindle of the trolley is completely grabbed or not; if yes, proceeding to S707, otherwise, repeating S706;

S707: binding, by the PLC, the yarn spindle with the tray;

S708: transporting, by the target AGV device, the yarn spindle from the robot to the weighing device, and then proceeding to S709; and S709: acquiring, by the control apparatus, a binding relationship between the yarn spindle and the tray from the PLC and recording the binding relationship to the database.

Figure 8:
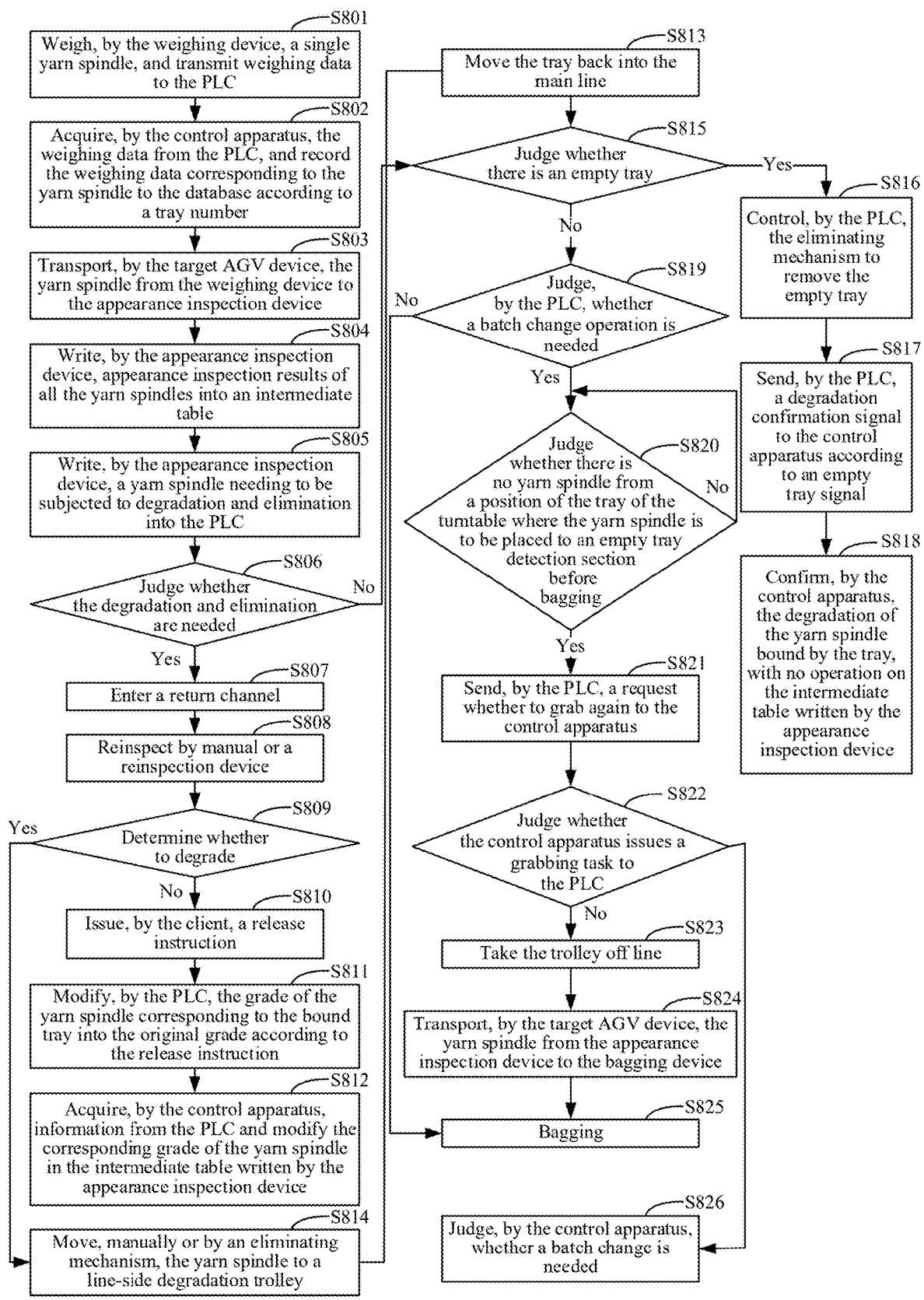
FIG. 8 is a fourth flowchart of the yarn spindle packaging in accordance with the embodiment of the present disclosure.

FIG. 8 is a fourth flowchart of the yarn spindle packaging. As shown in FIG. 8, the processing flow may include:

S801: weighing, by the weighing device, a single yarn spindle, and transmitting weighing data to the PLC;

S802: acquiring, by the control apparatus, the weighing data from the PLC, and recording the weighing data corresponding to the yarn spindle to the database according to a tray number;

S803: transporting, by the target AGV device, the yarn spindle from the weighing device to the appearance inspection device, and then proceeding to S804;

S804: writing, by the appearance inspection device, appearance inspection results of all the yarn spindles into an intermediate table;

S805: writing, by the appearance inspection device, a yarn spindle needing to be subjected to degradation and elimination into the PLC, wherein the degradation and elimination means that the yarn spindle needs to be degraded and eliminated from the yarn spindles of this batch number due to appearance defects;

S806: judging whether the degradation and elimination are needed; if yes, proceeding to S807; otherwise, proceeding to S815;

S807: entering a return channel;

S808: reinspecting by manual or a reinspection device;

S809: determining whether to degrade; if yes, proceeding to S814; otherwise, proceeding to S810;

S810: issuing, by the client, a release instruction, wherein the release instruction is used to indicate that the yarn spindle is released, that is, that the yarn spindle is not subjected to the degradation and elimination;

S811: modifying, by the PLC, the grade of the yarn spindle corresponding to the bound tray into the original grade according to the release instruction;

S812: acquiring, by the control apparatus, information from the PLC and modifying the corresponding grade of the yarn spindle in the intermediate table written by the appearance inspection device;

S813: moving the tray back into the main line and then proceeding to S815;

S814: moving, manually or by an eliminating mechanism, the yarn spindle to a line-side degradation trolley, and then returning to S813;

S815: judging whether there is an empty tray; if yes, proceeding to S816; otherwise, proceeding to S819;

S816: controlling, by the PLC, the eliminating mechanism to remove the empty tray;

S817: sending, by the PLC, a degradation confirmation signal to the control apparatus according to an empty tray signal;

S818: confirming, by the control apparatus, the degradation of the yarn spindle bound by the tray, with no operation on the intermediate table written by the appearance inspection device;

S819: judging, by the PLC, whether a batch change operation is needed; if yes, proceeding to S820; otherwise, proceeding to S824;

S820: judging whether there is no yarn spindle from a position of the tray of the turntable where the yarn spindle is to be placed to an empty tray detection section before bagging; if yes, proceeding to S821; otherwise, repeating S820;

S821: sending, by the PLC, a request whether to grab again to the control apparatus;

S822: judging whether the control apparatus issues a grabbing task to the PLC; if yes, proceeding to S826; otherwise, proceeding to S823, wherein the grabbing task may include: a grabbing position, a grabbing number and the like;

S823: taking the trolley off line;

S824: transporting, by the target AGV device, the yarn spindle from the appearance inspection device to the bagging device, and then proceeding to S825;

S825: bagging;

S826: judging, by the control apparatus, whether a batch change is needed.

Figure 9:
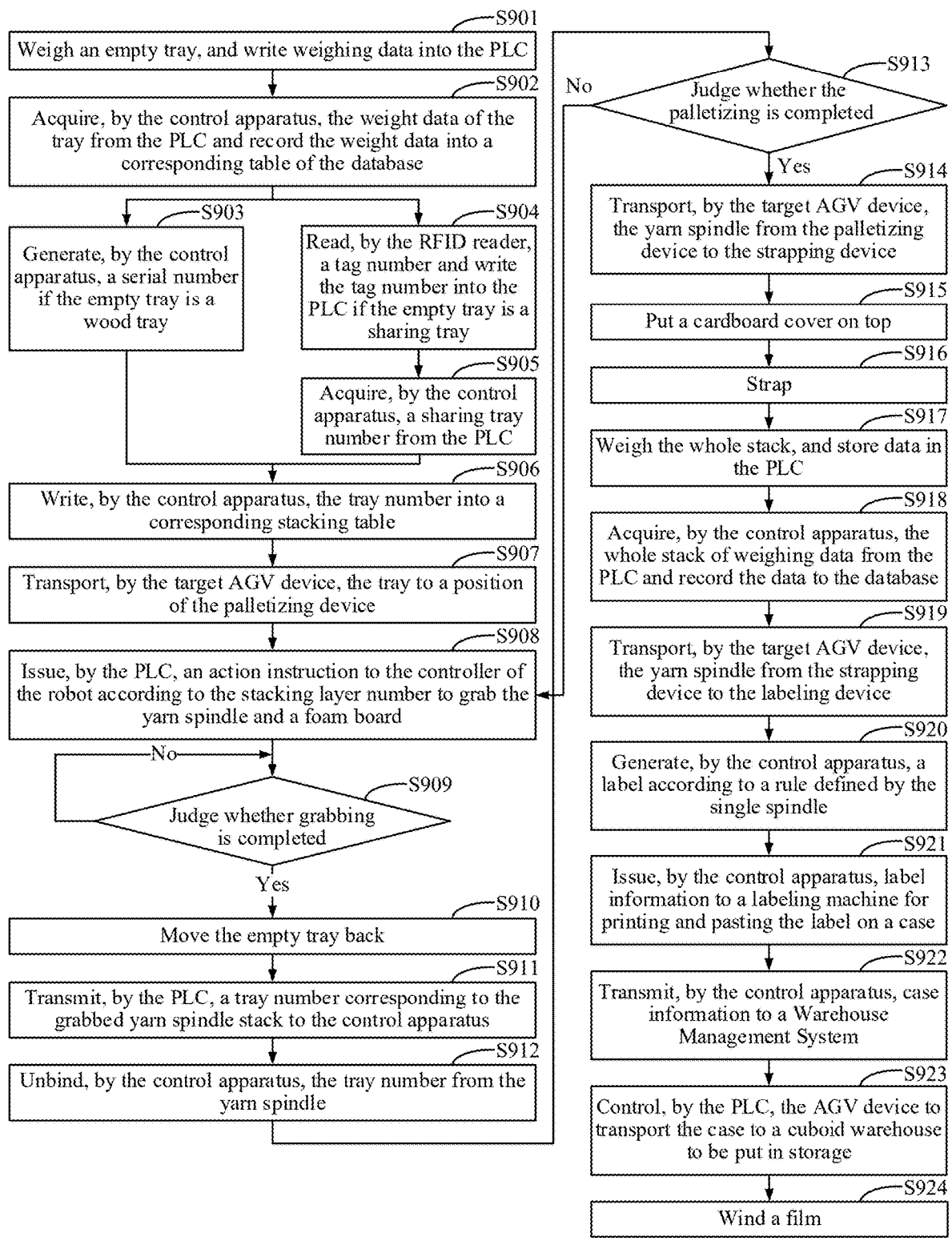
FIG. 9 is a fifth flowchart of the yarn spindle packaging in accordance with the embodiment of the present disclosure.

FIG. 9 is a fifth flowchart of the yarn spindle packaging. As shown in FIG. 9, the processing flow may include:

S901: weighing an empty tray, and writing weighing data into the PLC;

S902: acquiring, by the control apparatus, the weight data of the tray from the PLC and recording the weight data into a corresponding table of the database;

S903: generating, by the control apparatus, a serial number if the empty tray is a wood tray;

S904: reading, by the RFID reader, a tag number and writing the tag number into the PLC if the empty tray is a sharing tray;

S905: acquiring, by the control apparatus, a sharing tray number from the PLC;

S906: writing, by the control apparatus, the tray number into a corresponding stacking table;

S907: transporting, by the target AGV device, the tray to a position of the palletizing device;

S908: issuing, by the PLC, an action instruction to the controller of the robot according to the stacking layer number to grab the yarn spindle and a foam board;

S909: judging whether grabbing is completed; if yes, proceeding to S910; otherwise, repeating S909;

S910: moving the empty tray back;

S911: transmitting, by the PLC, a tray number corresponding to the grabbed yarn spindle stack to the control apparatus;

S912: unbinding, by the control apparatus, the tray number from the yarn spindle;

S913: judging whether the palletizing is completed; if yes, proceeding to S914; if otherwise, returning to S908;

S914: transporting, by the target AGV device, the yarn spindle from the palletizing device to the strapping device, and then proceeding to S915;

S915: putting a cardboard cover on top; S916: strapping;

S917: weighing the whole stack, and storing data in the PLC;

S918: acquiring, by the control apparatus, the whole stack of weighing data from the PLC and recording the data to the database;

S919: transporting, by the target AGV device, the yarn spindle from the strapping device to the labeling device, and then proceeding to S920;

S920: generating, by the control apparatus, a label according to a rule defined by the single spindle;

S921: issuing, by the control apparatus, label information to a labeling machine for printing and pasting the label on a case;

S922: transmitting, by the control apparatus, case information to a Warehouse Management System (WMS);

S923: controlling, by the PLC, the AGV device to transport the case to a cuboid warehouse to be put in storage; and S924: winding a film.

It should be understood that the flowcharts shown in FIGS. 5 to 9 are only illustrative and not restrictive, and the above processing flows can be adaptively adjusted or changed according to the operation requirements, the description of which will be omitted herein. Various obvious changes and/or substitutions can be made by those skilled in the art based on the examples of FIGS. 5 to 9, and resulting technical solutions still falls within the scope of the embodiment of the present disclosure.

In the embodiment of the disclosure, the control method of the yarn spindle packaging system may further include: for yarn spindles to be packaged with a same batch number, assigning an AGV device to a plurality of stand-alone devices, and dispatching the AGV device to transport the yarn spindles to be packaged among the plurality of stand-alone devices.

In the embodiment of the disclosure, the control method of the yarn spindle packaging system may further include: for yarn spindles to be packaged with the same batch number, assigning an AGV device to every two adjacent stand-alone devices in the plurality of stand-alone devices, and dispatching the plurality of AGV devices to transport the yarn spindles to be packaged among the plurality of stand-alone devices.

As to the specific way to assign and dispatch the AGV devices for the yarn spindle to be packaged with the same batch number, reference may be made to the above description, and details are not described herein.

In such a manner, it is possible to generate the different dispatching schemes according to the same batch of the yarn spindles to be packaged, advantageously improving the flexibility and the intelligentization of the yarn spindle packaging system and improving the efficiency of the yarn spindle packaging.

In the embodiment of the disclosure, the control method of the yarn spindle packaging system may further include: under the condition that different types of yarn spindles are simultaneously packaged, assigning an AGV device to each type of yarn spindle, and dispatching the AGV device matched with a target type of yarn spindle to transport the target type of yarn spindle among a plurality of stand-alone devices.

In the embodiment of the disclosure, the control method of the yarn spindle packaging system may further include: under the condition that different types of yarn spindles are simultaneously packaged, assigning the plurality of AGV devices to each type of yarn spindle, and dispatching the plurality of AGV devices matched with a target type of yarn spindle to transport the target type of yarn spindle among a plurality of stand-alone devices.

As to the specific way to assign and dispatch AGV devices for the yarn spindles of the different target types under the condition that the different types of yarn spindles are simultaneously packaged, reference may be made to the above description, and details are not described herein.

In such a manner, it is possible to assign and dispatch the AGV device for the various target types of yarn spindles according to the packaging process of the respective target types of yarn spindles under the condition that the different types of yarn spindles are simultaneously packaged, so as to realize the requirement of simultaneously packaging the different types of yarn spindles, advantageously improving the intelligentization of the yarn spindle packaging and improving the quality and the efficiency of the yarn spindle packaging.

In the embodiment of the disclosure, the control method of the yarn spindle packaging system may further include: determining, upon receipt of alarm information sent from a first target AGV device, a second target AGV device in place of the first target AGV device; and sending the dispatching instruction to the second target AGV device so that the second target AGV device transports the target yarn spindle to be transported from the first stand-alone device to the second stand-alone device based on the dispatching instruction.

As to the specific way to determine the second target AGV device in place of the first target AGV device upon receipt of the alarm information sent from the first target AGV device, reference may be made to the above description, and details are not described herein.

In such a manner, if the first target AGV device is abnormal, it will be possible to determine the replaceable second target AGV device so as to reasonably assign and dispatch the AGV device, such that the control apparatus advantageously enables overall planning and control over the plurality of AGV devices, thereby improving a speed of yarn spindle packaging.

In the embodiment of the disclosure, the control method of the yarn spindle packaging system may further include: determining a state of the target yarn spindle to be transported and determining the target AGV device based on the state, wherein different AGV devices are applicable to the yarn spindles of different states.

As to the specific way to determine the target AGV device based on the state of the target yarn spindle to be transported, reference may be made to the above description, and details are not described herein.

In such a manner, by determining the target AGV device according to the state of the target yarn spindle, it is possible to improve the adaptability between the target yarn spindle and the target AGV device, thereby improving the quality and the efficiency of yarn spindle packaging.

In the embodiment of the disclosure, the control method of the yarn spindle packaging system may further include: under the condition that different types of yarn spindles are simultaneously packaged, if an AGV device in an idle state does not meet the demand information, assigning the AGV device to a yarn spindle packaging task with a high priority according to packaging progresses of the different types of yarn spindles.

As to the specific way to assign the AGV device to the yarn spindle with the high priority under the condition that the different types of yarn spindles are simultaneously packaged, reference may be made to the above description, and details are not described herein.

In such a manner, by assigning and scheduling the AGV device for the yarn spindle with the higher priority, it is advantageous to flexibly ensure the packaging of the yarn spindle with the high priority, thereby improving the efficiency of the yarn spindle packaging.

In the embodiment of the disclosure, the control method of the yarn spindle packaging system may further include: receiving respective use information corresponding to the plurality of AGV devices sent from the dispatching apparatus; and adjusting the device control parameter and the packaging task of each stand-alone device based on the use information and the working data returned by each stand-alone device.

As to the specific way to adjust the device control parameter and the packaging task of each stand-alone device based on the use information and the working data returned by each stand-alone device, reference may be made to the above description, and details are not described herein.

In such a manner, by adjusting the device control parameters and the packaging tasks of each stand-alone device according to the use information of each AGV device and the working data of each stand-alone device, it is advantageous to realize the intelligentization of the yarn spindle packaging system and the flexibility of yarn spindle packaging, thereby improving the efficiency of yarn spindle packaging.

In the embodiment of the disclosure, the control method of the yarn spindle packaging system may further include: acquiring dispatching data in a first time period; inputting the dispatching data in the first time period into a dispatching model to acquire a dispatching data prediction value in a second time period output by the dispatching model, the dispatching model being obtained by training a dispatching data sample and being used for predicting the dispatching data; determining candidate AGV devices from the plurality of AGV devices based on the dispatching data prediction value; and determining, upon receipt of the demand information, the target AGV device from the candidate AGV devices based on the demand information.

Here, the first time period is a past time, and the second time period is a future time.

In such a manner, it is possible to predict the dispatching data of the second time period based on the data of the first time period and determine the target AGV device from the candidate AGV devices based on the predicted dispatching data, advantageously realizing the intelligentization of the yarn spindle packaging system and improving the efficiency of the yarn spindle packaging.

Figure 10:
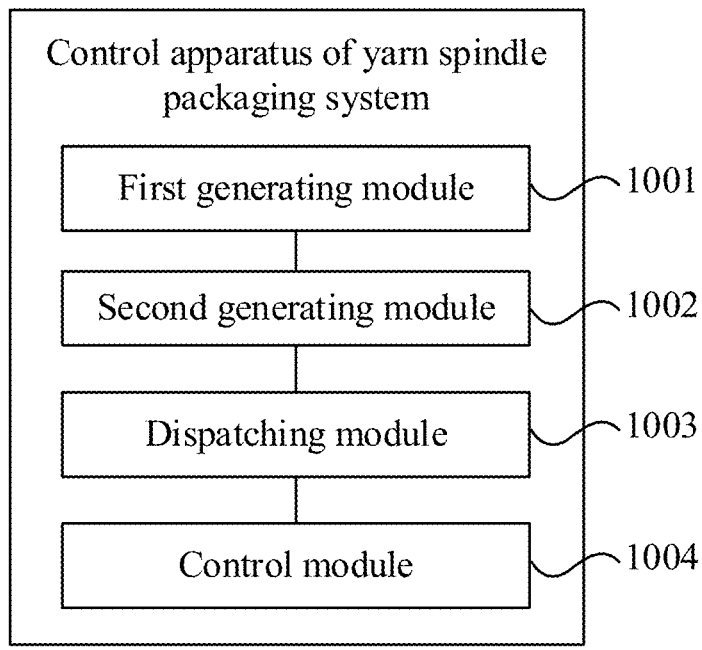
FIG. 10 is a block diagram of a control apparatus of the yarn spindle packaging system in accordance with the embodiment of the present disclosure.

The embodiment of the present disclosure provides a control apparatus of a yarn spindle packaging system. As shown in FIG. 10, the control apparatus of the yarn spindle packaging system may include:

a first generating module 1001, configured to generate a packaging task and a device control parameter of each stand-alone device according to a number and a type of a yarn spindle to be packaged, so that each stand-alone device executes the packaging task corresponding to the stand-alone device based on the device control parameter corresponding to the stand-alone device;

a second generating module 1002, configured to generate demand information based on the working data returned from each stand-alone device;

a dispatching module 1003, configured to generate a dispatching instruction based on the demand information and respective state information corresponding to a plurality of AGV devices;

a control module 1004, configured to control a target AGV device to determine a first stand-alone device and a second stand-alone device corresponding to the target AGV device based on the dispatching instruction corresponding to the target AGV device and transport a target yarn spindle to be transported from the first stand-alone device to the second stand-alone device, wherein the yarn spindle packaging system adopts the yarn spindle packaging system described in any one of the above embodiments.

In some implementations, the control apparatus of the yarn spindle packaging system may further include: a first dispatching module (not shown in FIG. 10) configured to, for yarn spindles to be packaged with the same batch number, assign an AGV device to a plurality of stand-alone devices, and dispatch the AGV device to transport the yarn spindles to be packaged among the plurality of stand-alone devices; or for yarn spindles to be packaged with a same batch number, assign an AGV device to every two adjacent stand-alone devices in the plurality of stand-alone devices, and dispatch the plurality of AGV devices to transport the yarn spindles to be packaged among the plurality of stand-alone devices.

In some implementations, the control apparatus of the yarn spindle packaging system may further include: a second dispatching module (not shown in FIG. 10) configured to, under the condition that different types of yarn spindles are simultaneously packaged, assign an AGV device to each type of yarn spindle, and dispatch the AGV device matched with a target type of yarn spindle to transport the target type of yarn spindle among a plurality of stand-alone devices; or under the condition that different types of yarn spindles are simultaneously packaged, assign a plurality of AGV devices to each type of yarn spindle, and dispatch the plurality of AGV devices matched with a target type of yarn spindle to transport the target type of yarn spindle among a plurality of stand-alone devices.

In some implementations, the control apparatus of the yarn spindle packaging system may further include: a first determining module (not shown in FIG. 10) configured to determine, upon receipt of alarm information sent from a first target AGV device, a second target AGV device in place of the first target AGV device; and a sending module (not shown in FIG. 10) configured to send the dispatching instruction to the second target AGV device so that the second target AGV device transports the target yarn spindle to be transported from the first stand-alone device to the second stand-alone device based on the dispatching instruction.

In some implementations, the control apparatus of the yarn spindle packaging system may further include: a second determining module (not shown in FIG. 10) configured to determine a state of the target yarn spindle to be transported; a third determining module (not shown in FIG. 10) configured to determine the target AGV device based on the state, wherein different AGV devices are applicable to the yarn spindles of different states.

In some implementations, the control apparatus of the yarn spindle packaging system may further include: an assigning module (not shown in FIG. 10) configured to, under the condition that the different types of yarn spindles are simultaneously packaged, if an AGV device in an idle state does not meet the demand information, assign the AGV device to a yarn spindle packaging task with a high priority according to packaging progresses of the different types of yarn spindles.

In some implementations, the control apparatus of the yarn spindle packaging system may further include: a receiving module (not shown in FIG. 10) configured to receive respective use information corresponding to the plurality of AGV devices sent from the dispatching apparatus; and an adjusting module (not shown in FIG. 10) configured to adjust the device control parameter and the packaging task of each stand-alone device based on the use information and the working data returned by each stand-alone device.

In some implementations, the control apparatus of the yarn spindle packaging system may further include: a first acquiring module (not shown in FIG. 10) configured to acquire dispatching data in a first time period; a second acquiring module (not shown in FIG. 10) configured to input the dispatching data in the first time period into a dispatching model to acquire a dispatching data prediction value in a second time period output by the dispatching model, the dispatching model being obtained by training a dispatching data sample and being used for predicting the dispatching data; a fourth determining module (not shown in FIG. 10) configured to determine candidate AGV devices from the plurality of AGV devices based on the dispatching data prediction value; and a fifth determining module (not shown in FIG. 10) configured to determine, upon receipt of the demand information, the target AGV device from the candidate AGV devices based on the demand information.

It should be appreciated by those skilled in the art that functions of the processing modules in the control apparatus of the yarn spindle packaging system according to the embodiment of the disclosure can be understood with reference to the description of the control method of the yarn spindle packaging system as set forth above, and the processing modules in the control apparatus of the yarn spindle packaging system according to the embodiment of the present disclosure can be implemented by an analog circuit that implements the functions according to the embodiment of the present disclosure, or can be implemented by running software that implements the functions according to the embodiment of the present disclosure on an electronic device.

The control apparatus of the yarn spindle packaging system according to the embodiment of the present disclosure can generate the dispatching instruction through the demand information of the control apparatus and the state information of the AGV device, and can dispatch the AGV device based on the dispatching instruction to realize intelligent yarn spindle transportation of the AGV device among the stand-alone devices, thereby improving the intelligentization and the flexibility of the yarn spindle packaging system, improving efficiency of the yarn spindle transportation, and improving efficiency of the yarn spindle packaging.

According to the embodiment of the present disclosure, the present disclosure also provides an electronic device and a readable storage medium.

Figure 11:
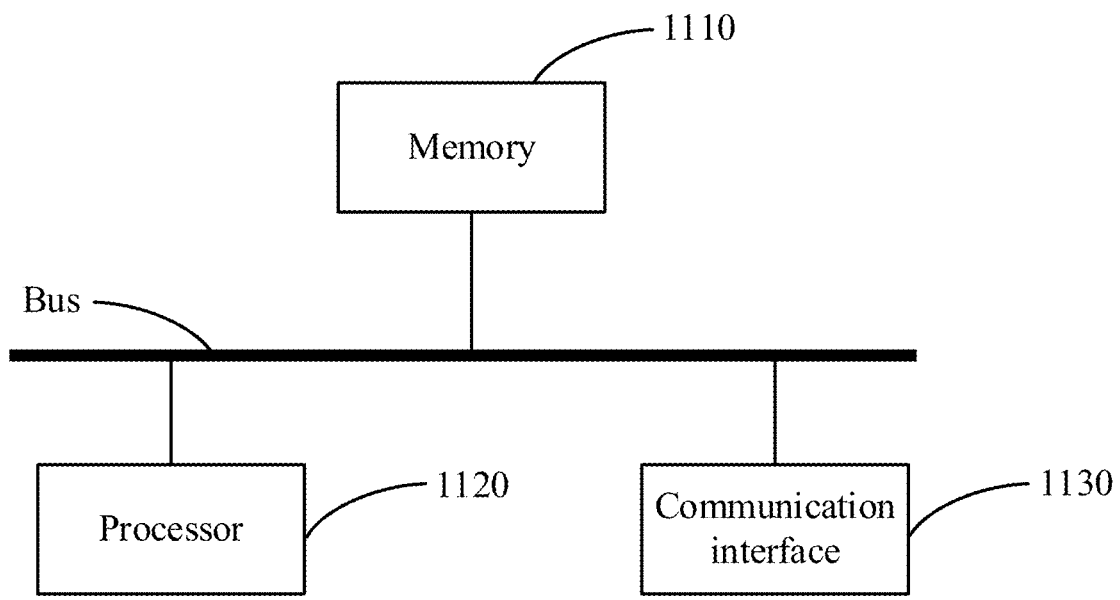
FIG. 11 is a block diagram of an electronic device for implementing the control method of the yarn spindle packaging system in accordance with the embodiment of the present disclosure.

FIG. 11 is a block diagram of an electronic device according to the embodiment of the present disclosure. As shown in FIG. 11, the electronic device includes: a memory 1110 and a processor 1120, the memory 1110 storing therein a computer program operable on the processor 1120. The number of the memory 1110 and the processor 1120 may be one or more. The memory 1110 may store one or more computer programs that, when executed by the electronic device, cause the electronic device to perform the methods according to the above-described method embodiment. The electronic device may further include: a communication interface 1130 is used for communicating with an external device to perform data interactive transmission.

If the memory 1110, the processor 1120, and the communication interface 1130 are implemented independently, the memory 1110, the processor 1120, and the communication interface 1130 may connect to and communicate with each other through a bus. The bus may be an Industry Standard Architecture (ISA) bus, a Peripheral Component Interconnect (PCI) bus, an Extended ISA (EISA) bus, or the like. The bus may be divided into an address bus, a data bus, a control bus, for example. For sake of illustration, the bus is represented by only one thick line in FIG. 11, but it does not mean only one bus or one type of bus is provided.

Optionally, in a specific implementation, if the memory 1110, the processor 1120, and the communication interface 1130 are integrated on a chip, the memory 1110, the processor 1120, and the communication interface 1130 may communicate with each other through an internal interface.

It should be understood that the processor may be a Central Processing Unit (CPU) or other general-purpose processor, a Digital Signal Processing (DSP), an Application Specific Integrated Circuit (ASIC), a Field Programmable Gate Array (FPGA) or other programmable logic device, discrete gate or transistor logic device or discrete hardware components, for example. The general-purpose processor may be a microprocessor or any conventional processor. It is noted that the processor may be a processor supporting Advanced RISC Machine (ARM) architecture.

Further, optionally, the memory may include a read-only memory and a random-access memory, and may further include a nonvolatile random-access memory. The memory may be a volatile memory or a nonvolatile memory, or may include both the volatile and the nonvolatile memory. The non-volatile memory may include a Read-Only Memory (ROM), a Programmable ROM (PROM), an Erasable PROM (EPROM), an Electrically EPROM (EEPROM), or a flash Memory. The volatile memory may include a Random-Access Memory (RAM), which acts as an external cache memory. By way of example and not limitation, many forms of RAM are available, such as Static RAM (SRAM), Dynamic Random-Access Memory (DRAM), Synchronous DRAM (SDRAM), Double Data Rate SDRAM (DDR SDRAM), Enhanced SDRAM (ESDRAM), Synchlink DRAM (SLDRAM), and Direct RAMBUS RAM (DR RAM).

The above embodiments may be implemented in whole or in part by software, hardware, firmware, or any combination thereof. When implemented in software, they may be implemented in whole or in part in the form of a computer program product. The computer program product includes one or more computer instruction. The computer instruction, when loaded and executed on a computer, can all or partially generate the flows or functions described in accordance with the embodiments of the disclosure. The computer may be a general-purpose computer, a special purpose computer, a network of computers, or other programmable devices. The computer instruction can be stored in a computer-readable storage medium or transmitted from one computer-readable storage medium to another computer-readable storage medium. For example, the computer instruction can be transmitted from one website, computer, server, or data center to another website, computer, server, or data center via wire (e.g., coaxial cable, fiber optic or Digital Subscriber Line (DSL)) or wireless (e.g., infrared, Bluetooth of microwave). The computer-readable storage medium can be any available medium that can be accessed by a computer or a data storage device, such as a server and a data center, that includes one or more available medium integration. The available medium may be a magnetic medium (e.g., floppy Disk, hard Disk, magnetic tape), an optical medium (e.g., Digital Versatile Disk (DVD)), or a semiconductor medium (e.g., Solid State Disk (SSD)), for example. It should be noted that the computer-readable storage medium referred to in the disclosure can be non-volatile storage medium, i.e., non-transitory storage medium.

It will be understood by those skilled in the art that all or part of the steps for performing the above embodiments may be implemented by hardware, or may be implemented by a program instructing relevant hardware, where the program may be stored in a computer-readable storage medium, and the storage medium may be a read-only memory, a magnetic disk or an optical disk.

In the description of the embodiments of the present disclosure, the description with reference to the terms such as "one embodiment", "some embodiments", "an example", "a specific example" or "some examples" means that a particular feature, structure, material, or characteristic described in connection with the embodiment or example is included in at least one embodiment or example of the present disclosure. Furthermore, the particular features, structures, materials, or characteristics described may be combined in any suitable manner in any one or more embodiments or examples. Moreover, various embodiments or examples and features in various embodiments or examples described in this specification can be combined and grouped by one skilled in the art if there is no mutual conflict.

In the description of the embodiments of the present disclosure, the sign "/" indicates a meaning of "or", for example, A/B indicates a meaning of A or B, unless otherwise specified. The term "and/or" herein is merely an association relationship describing associated objects, and means that there may be three relationships, for example, A and/or B may mean: A alone, both A and B, and B alone.

In the description of the embodiments of the present disclosure, the terms "first" and "second" are used for descriptive purposes only and should not be construed as indicating or implying relative importance or implicitly indicating the number of technical features as indicated. Thus, a feature defined as "first" or "second" may explicitly or implicitly include one or more features. In the description of the embodiments of the present disclosure, "a plurality" means two or more unless otherwise specified.

The above description is intended only to illustrate embodiments of the present disclosure, and should not be taken as limiting thereof, and any modifications, equivalents and improvements made within the spirit and principle of the present disclosure will fall within the scope of the present disclosure.

In the description of the specification, it will be understood that the terms "center", "longitudinal", "lateral", "length", "width", "thickness", "up", "down", "front", "rear", "left", "right", "vertical", "horizontal", "top", "bottom", "in", "out", "clockwise", "counterclockwise", "axial", "radial", "circumferential", and the like, are used based on the orientations and positional relationships shown in the drawings, and are used merely for convenience of description and simplicity of description, but do not indicate or imply that the device or element referred to must have a particular orientation, be constructed and operated in a particular orientation, and therefore should not be considered as limiting the present disclosure.

The invention claimed is:

1. A yarn spindle packaging system, comprising: a control apparatus, a dispatching apparatus, a plurality of stand-alone devices, and a plurality of AGV devices,
wherein the control apparatus is configured to generate a packaging task and a device control parameter of each stand-alone device according to a number and a type of a yarn spindle to be packaged;

each stand-alone device is configured to receive the packaging task and the device control parameter corresponding to the stand-alone device sent from the control apparatus, to execute the packaging task corresponding to the stand-alone device based on the device control parameter corresponding to the stand-alone device, and further to send working data corresponding to the packaging task corresponding to the stand-alone device to the control apparatus;

the control apparatus is further configured to generate demand information based on the working data returned from each stand-alone device;

the dispatching apparatus is further configured to generate a dispatching instruction based on the demand information and respective state information corresponding to the plurality of AGV devices, wherein the dispatching instruction is configured to dispatch movement of a target AGV device; and the target AGV device is configured to receive the dispatching instruction corresponding to the target AGV device, determine a first stand-alone device and a second stand-alone device corresponding to the target AGV device based on the dispatching instruction corresponding to the target AGV device, and transport a target yarn spindle to be transported from the first stand-alone device to the second stand-alone device.

2. The yarn spindle packaging system of claim 1, wherein the plurality of stand-alone devices comprise at least:
a robot, a weighing device, an appearance inspection device, a bagging device, a palletizing device, a strapping device and a labeling device.

3. The yarn spindle packaging system of claim 1, wherein the dispatching apparatus is further configured to:
for yarn spindles to be packaged with a same batch number, assign an AGV device to the plurality of stand-alone devices, and dispatch the AGV device to transport the yarn spindles to be packaged among the plurality of stand-alone devices; or
for yarn spindles to be packaged with a same batch number, assign an AGV device to every two adjacent stand-alone devices in the plurality of stand-alone devices, and dispatch a plurality of first AGV devices from the plurality of AGV devices to transport the yarn spindles to be packaged among the plurality of stand-alone devices.

4. The yarn spindle packaging system of claim 3, wherein the dispatching apparatus is further configured to:
determine, upon receipt of alarm information sent from a first target AGV device, a second target AGV device in place of the first target AGV device; and
send the dispatching instruction to the second target AGV device so that the second target AGV device transports the target yarn spindle to be transported from the first stand-alone device to the second stand-alone device based on the dispatching instruction.

5. The yarn spindle packaging system of claim 1, wherein the dispatching apparatus is further configured to:
under the condition that different types of yarn spindles are simultaneously packaged, assign an AGV device to each type of yarn spindle, and dispatch the AGV device matched with a target type of yarn spindle to transport the target type of yarn spindle among the plurality of stand-alone devices; or
under the condition that different types of yarn spindles are simultaneously packaged, assign a plurality of second AGV devices from the plurality of AGV devices to each type of yarn spindle, and dispatch the plurality of second AGV devices matched with a target type of yarn spindle to transport the target type of yarn spindle among the plurality of stand-alone devices.

6. The yarn spindle packaging system of claim 1, wherein different AGV devices are applicable to different states of the yarn spindles; and the dispatching apparatus is further configured to:
determine a state of the target yarn spindle to be transported; and
determine the target AGV device based on the state.

7. The yarn spindle packaging system of claim 1, wherein the dispatching apparatus is further configured to:
under the condition that different types of yarn spindles are simultaneously packaged, and an AGV device in an idle state does not meet the demand information, assign the AGV device to a yarn spindle packaging task with a high priority according to packaging progresses of the different types of yarn spindles.

8. The yarn spindle packaging system of claim 1, wherein the control apparatus is further configured to:
receive respective use information corresponding to the plurality of AGV devices sent from the dispatching apparatus; and
adjust the device control parameter and the packaging task of each stand-alone device based on the use information and the working data returned by each stand-alone device.

9. The yarn spindle packaging system of claim 1, wherein the dispatching apparatus is further configured to:
acquire first dispatching data in a first time period;
input the first dispatching data in the first time period into a dispatching model to acquire a dispatching data prediction value in a second time period output by the dispatching model, the dispatching model being obtained by training a dispatching data sample and being used for predicting second dispatching data;
determine candidate AGV devices from the plurality of AGV devices based on the dispatching data prediction value; and
determine, upon receipt of the demand information, the target AGV device from the candidate AGV devices based on the demand information.

10. The yarn spindle packaging system of claim 1, wherein the AGV device comprises a controller and a transport mechanism,
wherein the transport mechanism is used for bearing a yarn spindle; and
the controller is used for determining a target parameter adaptive to the target yarn spindle to be transported based on the dispatching instruction; and adjusting the transport mechanism based on the target parameter so that the adjusted transport mechanism is adaptive to the target yarn spindle to be transported.

11. The yarn spindle packaging system of claim 1, wherein packaging of different types of yarn spindles shares the control apparatus, the dispatching apparatus, the plurality of AGV devices and at least part of the plurality of stand-alone devices; and/or
the plurality of stand-alone devices comprise a first type of stand-alone device, a second type of stand-alone device and a third type of stand-alone device; and the first type of stand-alone device, the second type of stand-alone device and the third type of stand-alone device are deployed in different areas, wherein the first type of stand-alone device is a stand-alone device suitable for packaging of a DTY yarn spindle, the second type of stand-alone device is a stand-alone device suitable for packaging of a POY yarn spindle, and the third type of stand-alone device is a stand-alone device suitable for packaging of a FDY yarn spindle.

12. A control method of a yarn spindle packaging system, comprising:
    generating a packaging task and a device control parameter of each of a plurality of stand-alone devices according to a number and a type of a yarn spindle to be packaged, so that each stand-alone device executes the packaging task corresponding to the stand-alone device based on the device control parameter corresponding to the stand-alone device;
    generating demand information based on working data returned from each stand-alone device;
    generating a dispatching instruction based on the demand information and respective state information corresponding to a plurality of AGV devices; and
    controlling a target AGV device to determine a first stand-alone device and a second stand-alone device corresponding to the target AGV device based on the dispatching instruction corresponding to the target AGV device, and to transport a target yarn spindle to be transported from the first stand-alone device to the second stand-alone device,
    wherein the yarn spindle packaging system comprises the yarn spindle packaging system of claim 1.

13. The control method of the yarn spindle packaging system of claim 12, further comprising:
    for yarn spindles to be packaged with a same batch number, assigning an AGV device to the plurality of stand-alone devices, and dispatching the AGV device to transport the yarn spindles to be packaged among the plurality of stand-alone devices; or
    for yarn spindles to be packaged with the same batch number, assigning an AGV device to every two adjacent stand-alone devices in the plurality of stand-alone devices, and dispatching a plurality of first AGV devices from the plurality of AGV devices to transport the yarn spindles to be packaged among the plurality of stand-alone devices.

14. The control method of the yarn spindle packaging system of claim 13, further comprising:
    determining, upon receipt of alarm information sent from a first target AGV device, a second target AGV device in place of the first target AGV device; and
    sending the dispatching instruction to the second target AGV device so that the second target AGV device transports the target yarn spindle to be transported from the first stand-alone device to the second stand-alone device based on the dispatching instruction.

15. The control method of the yarn spindle packaging system of claim 12, further comprising:
    under the condition that different types of yarn spindles are simultaneously packaged, assigning an AGV device to each type of yarn spindle, and dispatching the AGV device matched with a target type of yarn spindle to transport the target type of yarn spindle among the plurality of stand-alone devices; or
    under the condition that different types of yarn spindles are simultaneously packaged, assigning a plurality of second AGV devices from the plurality of AGV devices to each type of yarn spindle, and dispatching the plurality of second AGV devices matched with a target type of yarn spindle to transport the target type of yarn spindle among the plurality of stand-alone devices.

16. The control method of the yarn spindle packaging system of claim 12, further comprising:
    determining a state of the target yarn spindle to be transported; and
    determining the target AGV device based on the state, wherein different AGV devices are applicable to yarn spindles of different states.

17. The control method of the yarn spindle packaging system of claim 12, further comprising:
    under the condition that different types of yarn spindles are simultaneously packaged, and an AGV device in an idle state does not meet the demand information, assigning the AGV device to a yarn spindle packaging task with a high priority according to packaging progresses of the different types of yarn spindles.

18. The control method of the yarn spindle packaging system of claim 12, further comprising:
    receiving respective use information corresponding to the plurality of AGV devices sent from the dispatching apparatus; and
    adjusting the device control parameter and the packaging task of each stand-alone device based on the use information and the working data returned by each stand-alone device;
    wherein the control method further comprises:
    acquiring first dispatching data in a first time period;
    inputting the first dispatching data in the first time period into a dispatching model to acquire a dispatching data prediction value in a second time period output by the dispatching model, the dispatching model being obtained by training a dispatching data sample and being used for predicting second dispatching data;
    determining candidate AGV devices from the plurality of AGV devices based on the dispatching data prediction value; and
    determining, upon receipt of the demand information, the target AGV device from the candidate AGV devices based on the demand information.

19. An electronic device, comprising:
    at least one processor; and
    a memory connected in communication with the at least one processor;
    wherein the memory stores an instruction executable by the at least one processor, and the instruction, when executed by the at least one processor, enables the at least one processor to execute the method of claim 12.

20. A non-transitory computer-readable storage medium storing a computer instruction thereon, wherein the computer instruction is used to cause a computer to execute the method of claim 12.

* * * * *